(12) United States Patent
Sakakibara et al.

(10) Patent No.: US 10,322,625 B2
(45) Date of Patent: Jun. 18, 2019

(54) DOOR STRUCTURE FOR A VEHICLE

(71) Applicant: TOYOTA JIDOSHA KABUSHIKI KAISHA, Toyota-shi, Aichi-ken (JP)

(72) Inventors: Kosuke Sakakibara, Toyota (JP); Masanobu Ohmi, Kasugai (JP); Kazuki Sugie, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 15/452,355

(22) Filed: Mar. 7, 2017

(65) Prior Publication Data

US 2017/0342767 A1 Nov. 30, 2017

(30) Foreign Application Priority Data

May 26, 2016 (JP) ................................ 2016-105644

(51) Int. Cl.
| | |
|---|---|
| *B60J 5/04* | (2006.01) |
| *B60J 10/40* | (2016.01) |
| *B60J 10/84* | (2016.01) |
| *B60J 10/86* | (2016.01) |

(52) U.S. Cl.
CPC ............ *B60J 10/84* (2016.02); *B60J 5/0479* (2013.01); *B60J 10/40* (2016.02); *B60J 10/86* (2016.02)

(58) Field of Classification Search
CPC .. B60J 10/84; B60J 5/0479; B60J 2005/0475; B60J 10/40; B60J 10/86

USPC .......................................................... 701/49
See application file for complete search history.

(56) References Cited

U.S. PATENT DOCUMENTS

2012/0019023 A1   1/2012   Konchan et al.

FOREIGN PATENT DOCUMENTS

| JP | 2003-276449 A |   | 9/2003 |   |   |
|---|---|---|---|---|---|
| JP | 2006-088984 A |   | 4/2006 |   |   |
| JP | 2006088984 | * | 6/2006 | .............. | B60J 10/08 |
| JP | 2007-261377 A |   | 10/2007 |   |   |

* cited by examiner

*Primary Examiner* — Aaron L Troost
*Assistant Examiner* — Paula L Schneider
(74) *Attorney, Agent, or Firm* — Oliff PLC

(57) ABSTRACT

A vehicle door structure includes two doors, a weatherstrip, a moving device and a control device. The two doors are disposed adjacently at a vehicle side portion with no pillar therebetween. The weatherstrip is provided at one of the doors and is disposed to change a distance between the weatherstrip and the other door. The moving device moves the weatherstrip in a direction of putting the weatherstrip into contact with and a direction of separating the weatherstrip from the other door. When it is determined that the two doors are closed and neither is opening or closing, the control device controls movement of the moving device to put the weatherstrip into contact with the other door. When a single door is closed and the counterpart door is opening or closing, the control device controls movement of the moving device in the direction of separating the weatherstrip from the other door.

9 Claims, 13 Drawing Sheets

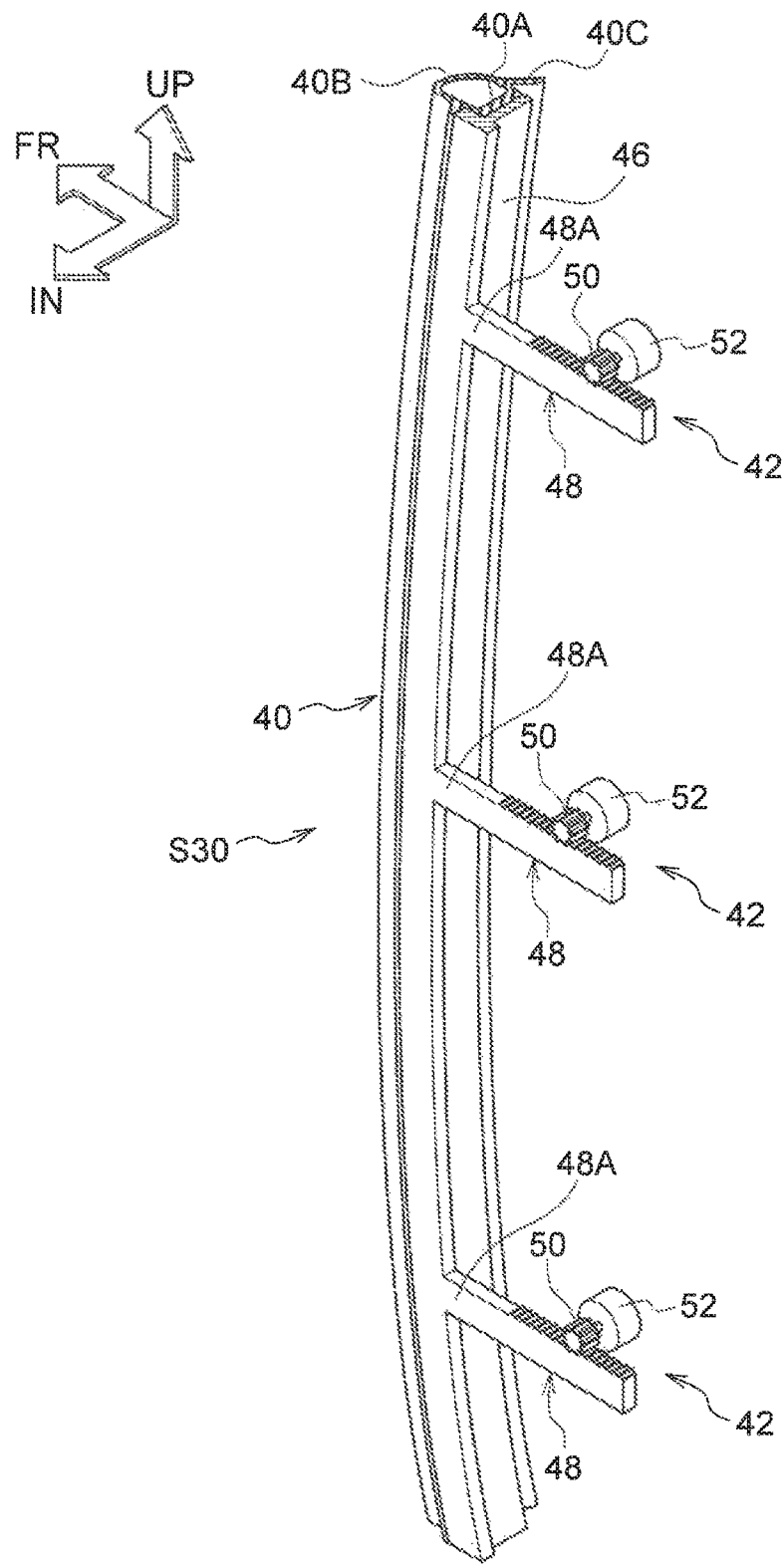

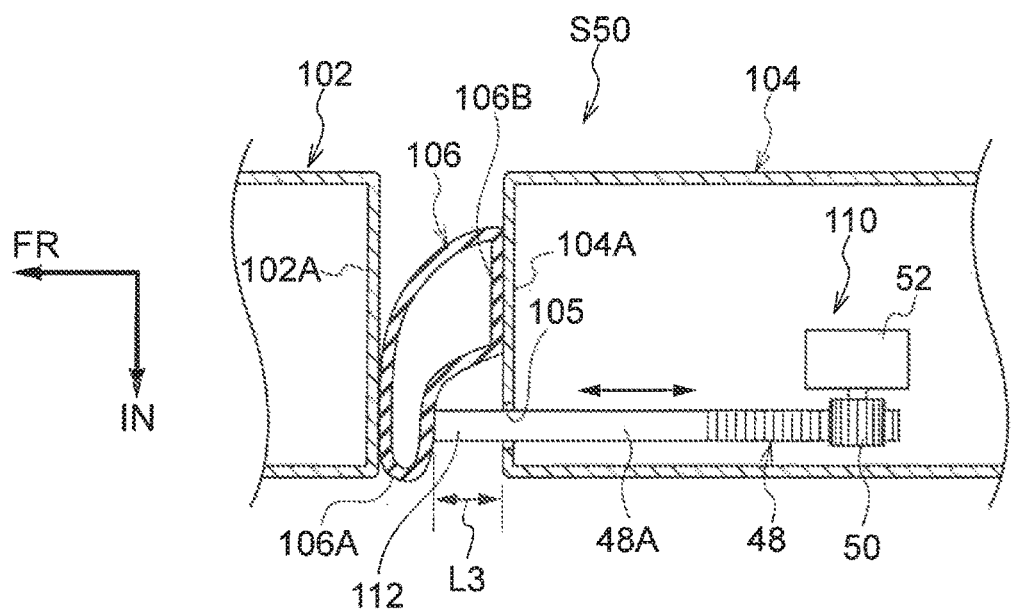
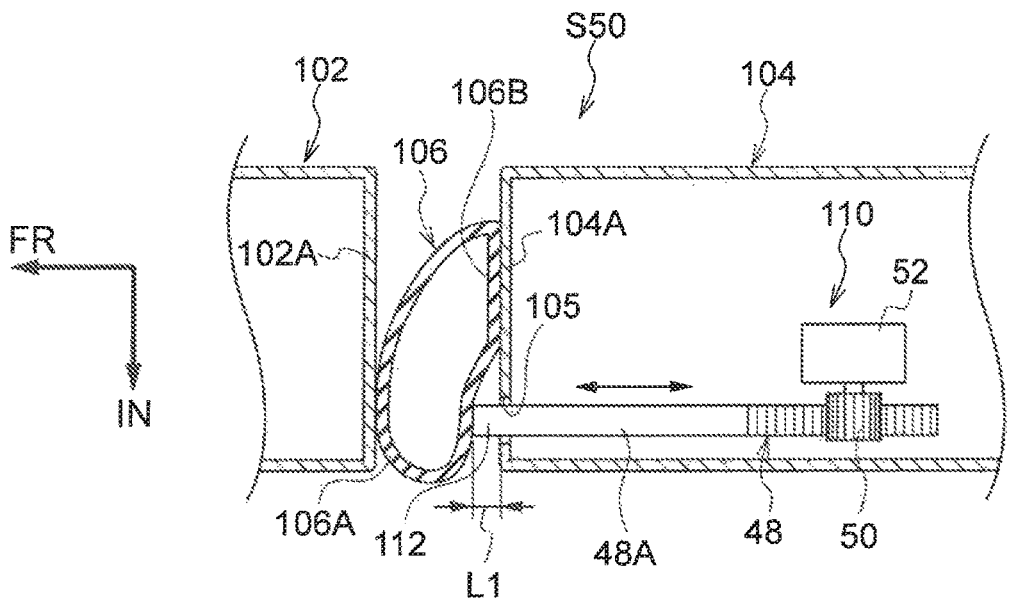

DOOR STRUCTURE FOR A VEHICLE

CROSS-REFERENCE TO RELATED APPLICATION

This application is based upon and claims the benefit of priority of the prior Japanese Patent Application No. 2016-105644, filed on May 26, 2016, the entire contents of which are incorporated herein by reference.

FIELD

The embodiments discussed herein are related to a door structure for a vehicle.

BACKGROUND

At a side portion or a rear portion of a vehicle, a structure in which doors are disposed directly adjacent to one another may be employed. For example, there are pillarless cars and the like in which no center pillar is provided at a vehicle side portion and doors are disposed adjacent to one another. Patent Document 1 (Japanese Patent Application Laid-Open (JP-A) No. 2006-088984) discloses a sealing structure for a door at a vehicle side portion at which no center pillar is provided, in which a motor provided at a roof portion is driven so as to press a weatherstrip provided at the roof portion against a front door at a vehicle width direction outer side. Patent document 2 (JP-A No. 2003-276449) recites a structure in which a weatherstrip is provided between front and rear side doors at a vehicle side portion at which no center pillar is provided.

In a vehicle side portion at which no center pillar is provided, in order to suppress water ingress between a front door and a rear door, a weatherstrip at one door, which is disposed between the one door and the other door, must be put into area contact with the other door. In this structure, unlike a structure in which a weatherstrip at one door is put into contact with a center pillar, friction at a contact portion of the weatherstrip against the other door may arise in association with opening and closing of the other door.

In the structure recited in Patent Document 1 (JP-A No. 2006-088984), the weatherstrip provided at the roof portion is moved to the vehicle width direction outer side by the motor. In regard to putting weatherstrips at locations other than the roof portion into area contact with a door, there is scope for improvement.

SUMMARY

In consideration of the circumstances described above, an object of the present invention is to provide a door structure for a vehicle that may realize both a suppression of water ingress between two doors where no pillar is present and a suppression of friction caused by contact between a weatherstrip provided at one door and the other door.

A door structure for a vehicle according to a first aspect includes: two doors that are disposed at a vehicle side portion to be adjacent to each other along a vehicle front and rear direction with no pillar therebetween, or that are disposed at a vehicle rear portion to be adjacent to each other along a vehicle left and right direction with no pillar therebetween; a weatherstrip provided at an outer periphery portion of at least one door of the two doors, the weatherstrip being disposed so as to change a distance between the one door and the other door of the two doors; a moving device that moves at least a portion of the weatherstrip in at least either one of a direction of putting the weatherstrip into area contact with the other door or a direction of separating the weatherstrip from the other door; and a control device that, when it is determined that the two doors are in closed states and neither of the two doors is opening or closing, controls movement of the moving device so as to put the weatherstrip into area contact with the other door, and when a single door of the two doors is in the closed state thereof and the counterpart door of the two doors is opening or closing, controls movement of the moving device in the direction of separating the weatherstrip from the other door.

According to the door structure for a vehicle recited in the first aspect, the two doors that are provided are disposed at a vehicle side portion to be adjacent to each other along a vehicle front and rear direction or are disposed at a vehicle rear portion to be adjacent to each other along a vehicle left and right direction. No pillar is provided between the two doors. The weatherstrip is disposed at the outer periphery portion of the at least one door of the two doors so as to change the distance from the other door of the two doors. At least a portion of each weatherstrip is moved by the moving device in at least either one of a direction of putting the weatherstrip into area contact with the other door or a direction of separating the weatherstrip from the other door. When it is determined that the two doors are not opening or closing in the state in which the two doors are closed, the control device causes the moving device to move the weatherstrip so as to put the weatherstrip into area contact with the other door. In a state in which one of the two doors (a single door) is closed, when the second of the two doors (the counterpart door) is opening or closing, the control device causes the moving device to move at least the weatherstrip in the direction away from the other door. Thus, in the state in which the two doors are closed, water ingress between the two doors where no pillar is present is suppressed by the weatherstrip at the one door being in area contact with the other door. Further, in the state in which one of the two doors (a single door) is closed, because the weatherstrip is moved in the direction away from the other door of the two doors when the second of the two doors (the counterpart door) is opening or closing, friction due to contact between the weatherstrip at the one door and the other door is suppressed. Therefore, a suppression of water ingress between the two doors where no pillar is present and a suppression of contact friction between the weatherstrip provided at the one door and the other door may both be realized.

In a door structure for a vehicle according to a second aspect, in the door structure for a vehicle recited in the first aspect, when a state in which the two doors are locked is detected or when a state in which a vehicle speed is at least a predetermined value is detected, the control device causes the moving device to move so as to put the weatherstrip into area contact with the other door.

According to the door structure for a vehicle recited in the second aspect, when the state in which the two doors are locked is detected or the state in which the vehicle speed is at least the predetermined value is detected, the weatherstrip is put into area contact with the other door by movement of the moving device. Thus, water ingress between the two doors is more effectively suppressed. Furthermore, because it is assured that the two doors will not be opening or closing when the state in which the two doors are locked is detected or the state in which the vehicle speed is at least the predetermined value is detected, contact friction between the weatherstrip provided at the one door and the other door may be suppressed.

In a door structure for a vehicle according to a third aspect, in the door structure for a vehicle recited in the first aspect, the moving device includes a moving member that moves in at least either one of a direction approaching the other door or a direction away from the other door, and a frame attached to an end portion of the moving member, and the weatherstrip is attached to the frame.

According to the door structure for a vehicle recited in the third aspect, the moving device is equipped with the frame attached to the end portion of the moving member, and the weatherstrip attached to the frame is moved by the moving member being moved in at least either one of a direction approaching the other door or a direction away from the other door. Thus, the weatherstrip is put into area contact with the other door or the weatherstrip is moved in the direction away from the other door. Therefore, the moving device may be structured integrally with the weatherstrip, in addition to which the weatherstrip may be put into substantially uniform area contact with the other door.

In a door structure for a vehicle according to a fourth aspect, in the door structure for a vehicle recited in the first aspect, the moving member includes a moving member that moves in at least either one of a direction approaching the other door or a direction away from the other door, and a protrusion portion that is provided at an end portion of the moving member and protrudes to the side thereof at which the other door is disposed, and a portion of the weatherstrip is pushed by the protrusion portion and moves to the side at which the other door is disposed.

According to the door structure for a vehicle recited in the fourth aspect, the moving device is equipped with the protrusion portion that protrudes toward the other door from the end portion of the moving member, and the protrusion portion is moved by the moving member being moved in at least either one of a direction approaching the other door or a direction away from the other door. When the protrusion portion pushes the portion of the weatherstrip, the portion of the weatherstrip is moved toward the other door and the portion of the weatherstrip is put into area contact with the other door. When the protrusion portion is moved in the direction away from the other door, the portion of the weatherstrip moves in the direction away from the other door. Therefore, with a simple structure, the portion of the weatherstrip may be put into area contact with the other door or the portion of the weatherstrip may be moved in the direction away from the other door.

In a door structure for a vehicle according to a fifth aspect, in the door structure for a vehicle recited in the first aspect, a plurality of moving devices are arranged in a vertical direction of the weatherstrip.

According to the door structure for a vehicle recited in the fifth aspect, the moving device is plurally arranged in the vertical direction of the weatherstrip. The weatherstrip is put into area contact with the other door or the weatherstrip is moved in the direction away from the other door by the plural moving devices being moved. Therefore, the weatherstrip may be consistently put into area contact with the other door, adherence between the weatherstrip and the other door may be improved, and the weatherstrip may be more assuredly separated from the other door.

In a door structure for a vehicle according to a sixth aspect, in the door structure for a vehicle recited in the fourth aspect, a protrusion amount of the protrusion portion to the side at which the other door is disposed is altered stepwise by the moving member, whereby a pressure force of the weatherstrip against the other door is altered.

According to the door structure for a vehicle recited in the sixth aspect, the protrusion amount of the protrusion portion toward the other door is altered stepwise by the moving member. Thus, the pressure force of the weatherstrip against the other door is altered. Therefore, water ingress between the weatherstrip and the other door may be effectively suppressed.

In a door structure for a vehicle according to a seventh aspect, in the door structure for a vehicle recited in the sixth aspect, a vehicle speed sensor that detects vehicle speeds is provided at the vehicle, and the control device alters a pressure force of the weatherstrip against the other door in accordance with a vehicle speed detected by the vehicle speed sensor.

According to the door structure for a vehicle recited in the seventh aspect, the control device alters the pressure force of the weatherstrip against the other door in accordance with vehicle speeds detected by the vehicle speed sensor. Therefore, water ingress between the weatherstrip and the other door during running of the vehicle may be more assuredly suppressed.

In a door structure for a vehicle according to an eighth aspect, in the door structure for a vehicle recited in the first aspect, a wet weather sensor that detects wet weather conditions is provided at the vehicle, and when a wet weather condition is detected by the wet weather sensor, the control device controls movement of the moving device in the direction of putting the weatherstrip into area contact with the other door.

According to the door structure for a vehicle recited in the eighth aspect, when a wet weather condition is detected by the wet weather sensor, the control device controls the moving device to move in the direction of putting the weatherstrip into area contact with the other door. Therefore, water ingress between the weatherstrip and the other door may be more assuredly suppressed in wet weather conditions.

According to the door structure for a vehicle relating to the present disclosure, both a suppression of water ingress between two doors where no pillar is present and a suppression of friction caused by contact between a weatherstrip provided at one door and the other door may be realized.

BRIEF DESCRIPTION OF DRAWINGS

FIG. 8 is a perspective view showing a weatherstrip and plural moving devices that are used in a door structure for a vehicle in accordance with a fourth exemplary embodiment.

FIG. 11A is a sectional diagram showing a weatherstrip in a state of output level 3 from a motor of a movement device that is used in the door structure for a vehicle in accordance with the sixth exemplary embodiment.

FIG. 11B is a sectional diagram showing the weatherstrip in a state of output level 1 from the motor of the movement device that is used in the door structure for a vehicle in accordance with the sixth exemplary embodiment.

DESCRIPTION OF EMBODIMENTS

Door structures for a vehicle according to exemplary embodiments of the present invention are described in accordance with the drawings. An arrow FR that is shown as appropriate in these drawings indicates a vehicle front side, an arrow UP indicates a vehicle upper side, and an arrow IN indicates a vehicle width direction inner side.

First Exemplary Embodiment

A door structure for a vehicle according to a first exemplary embodiment is described using FIG. 1 to FIG. 5.

Figure 1:
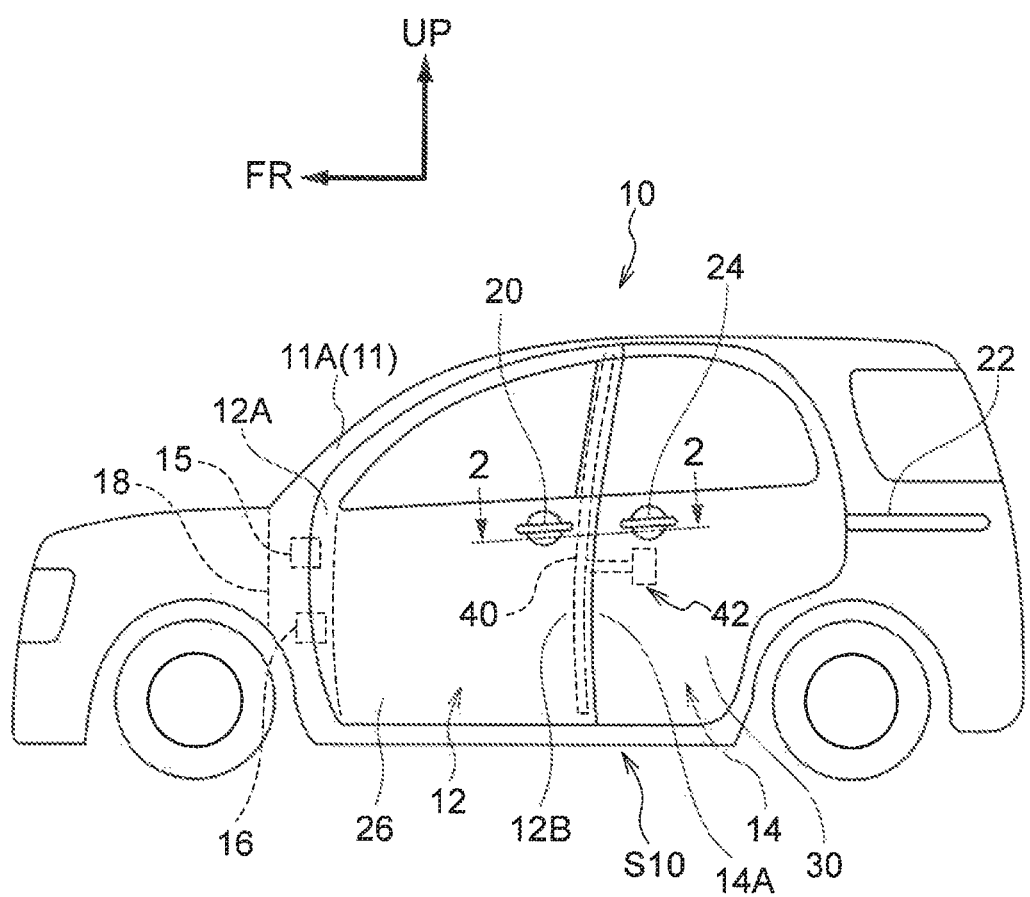
FIG. 1 is a side view showing a side portion of a vehicle in which a door structure for a vehicle in accordance with a first exemplary embodiment is employed.

FIG. 1 shows a side view of a vehicle 10 in which a door structure for a vehicle S10 according to the first exemplary embodiment is employed. As shown in FIG. 1, the vehicle 10 according to the first exemplary embodiment is a center-pillarless vehicle that does not have a center pillar. At a side portion 11A of a vehicle body 11, a front side door 12 and a rear side door 14 that serve as two doors are provided to be disposed to be adjacent at front and rear. That is, no center pillar is provided to serve as a pillar between the front side door 12 and the rear side door 14 that are disposed at adjacent locations of the side portion 11A of the vehicle body 11. As an example in the first exemplary embodiment, the front side door 12 is structured as a swing door and the rear side door 14 is structured as a sliding door.

A front end portion 12A of the front side door 12 is mounted at a front pillar 18 by a pair of upper and lower hinges 15 and 16. Thus, the front side door 12 can be swung between a closed position and an open position. A door outside handle 20 is provided at a vehicle vertical direction middle portion of a rear end portion 12B of the front side door 12. The front side door 12 is structured to be opened by an opening operation of the door outside handle 20. When the front side door 12 is being opened from the closed position shown in FIG. 3, the front side door 12 turns outward in the vehicle width direction (for example, in the direction of arrow R in FIG. 3) about the hinges 15 and 16.

The rear side door 14 is provided with rollers (not shown in the drawings) that serve as a sliding mechanism. A rail 22 disposed at the vehicle body 11 serves as the sliding mechanism with the rollers. The rear side door 14 can be slid between a closed position and and an open position along the rail 22. A door outside handle 24 is provided at a vehicle vertical direction middle portion of a front end portion 14A of the rear side door 14. The rear side door 14 is structured to be opened by an opening operation of the door outside handle 24. When the rear side door 14 is being opened from the closed position shown in FIG. 3, first, the rear side door 14 is moved diagonally to the vehicle outer-rear side (for example, the direction of arrow S in FIG. 3). Therefore, the front side door 12 and the rear side door 14 are not limited in order of opening and closing; even when one is closed, the other can be opened and closed.

Figure 2:
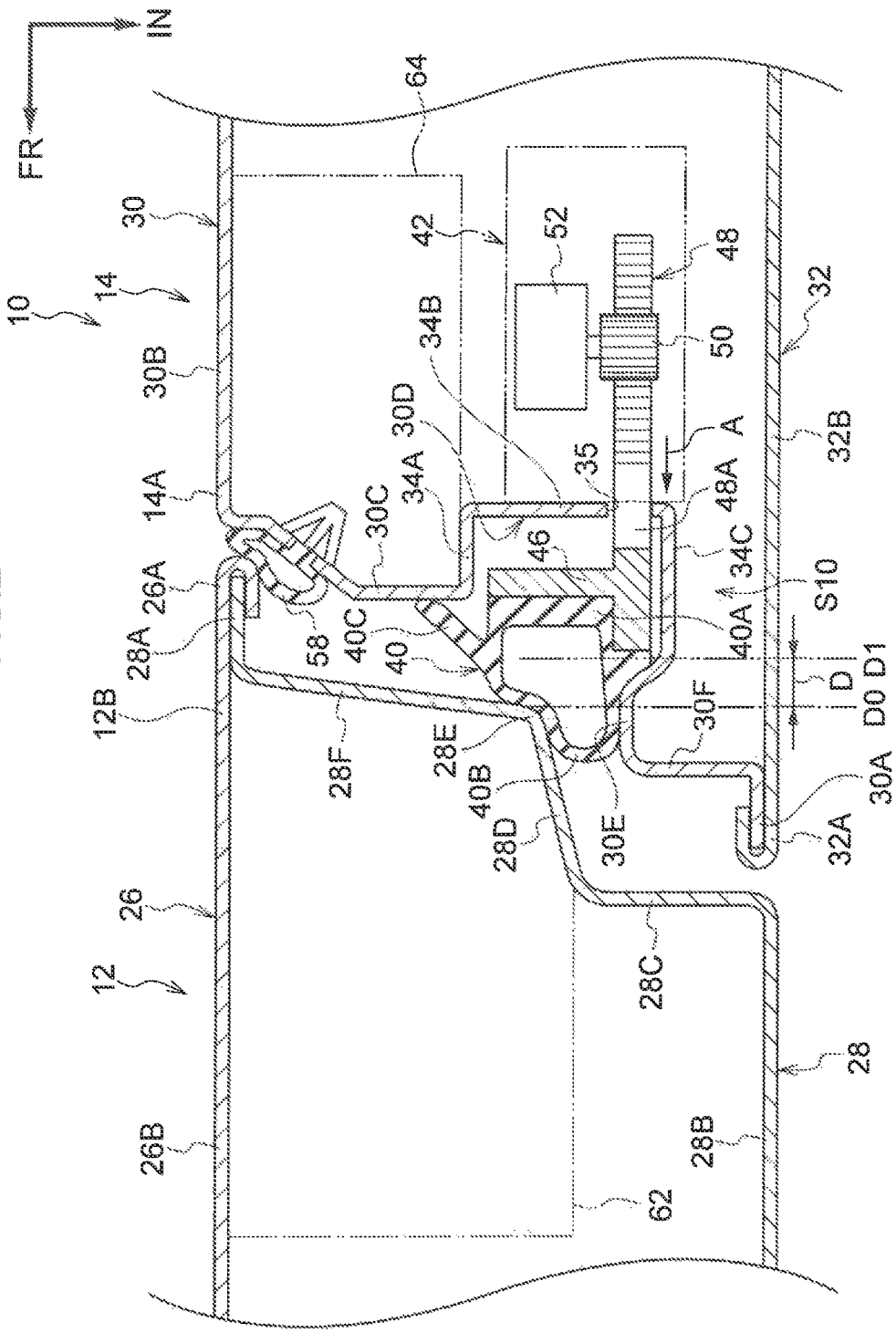
FIG. 2 is a sectional diagram showing the door structure for a vehicle cut along line 2-2 in FIG. 1, which is a diagram showing a state in which a weatherstrip is in area contact with a front side door.
Figure 3:
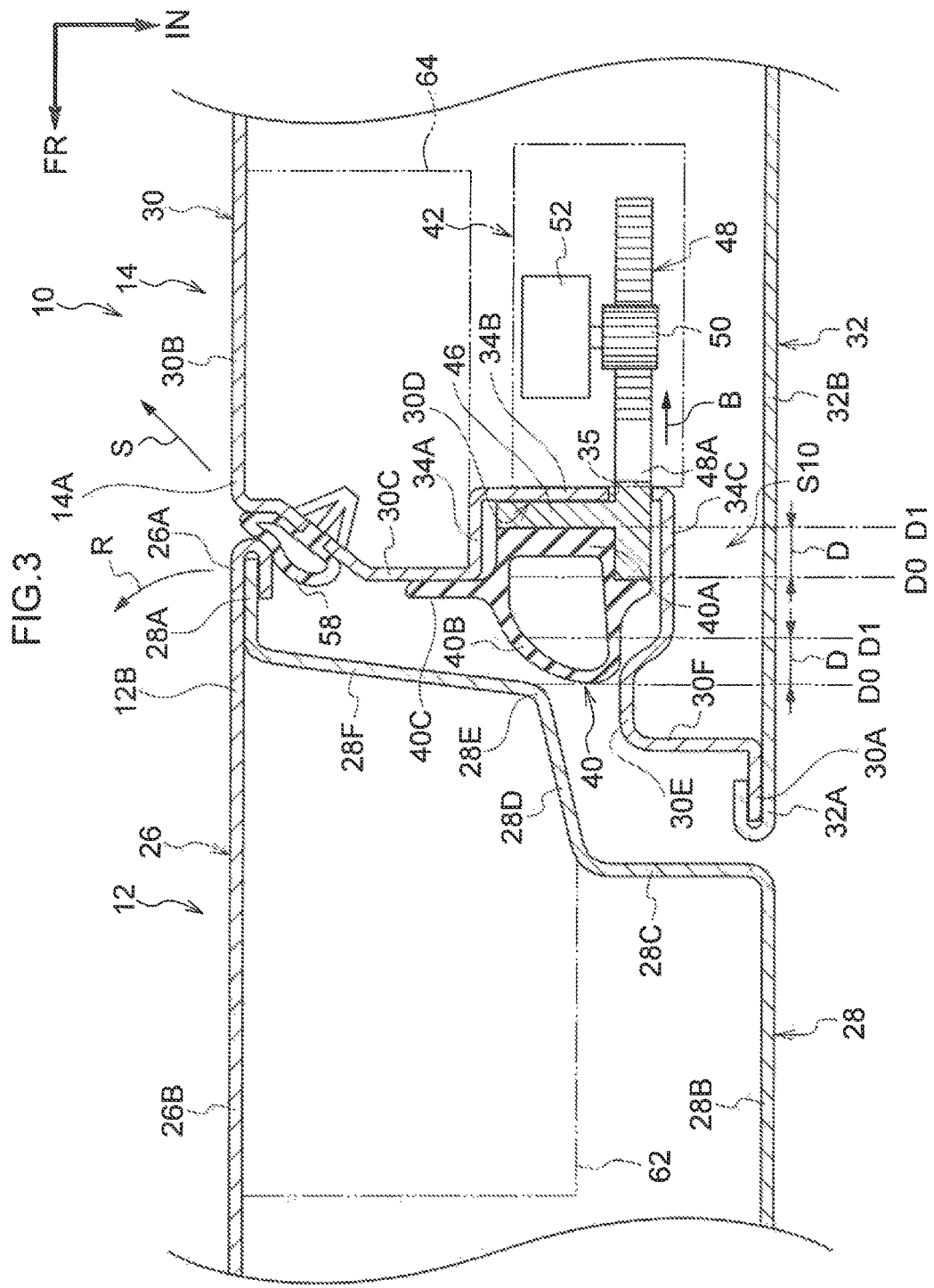
FIG. 3 is a sectional diagram showing the door structure for a vehicle cut along line 2-2 in FIG. 1, which is a diagram showing a state in which the weatherstrip is separated from the front side door.

FIG. 2 is a sectional diagram of the door structure for a vehicle S10 cut along line 2-2 in FIG. 1. FIG. 2 shows a state in which the front side door 12 and the rear side door 14 are closed, in a situation in which neither is opening or closing. FIG. 3 is another sectional diagram of the door structure for a vehicle S10 cut along line 2-2 in FIG. 1. FIG. 3 shows a state in which the front side door 12 or the rear side door 14 is opening from the state shown in FIG. 2. Actually, FIG. 2 and FIG. 3 are sectional diagrams showing the door structure for a vehicle S10 at the vehicle width direction right side in a rear view of the vehicle 10. In rear views of the vehicle 10, the door structure for a vehicle S10 is symmetrical between left and right at the vehicle width direction right side and the vehicle width direction left side. Therefore, no sectional diagram of the door structure for a vehicle S10 at the vehicle width direction right side in a rear view of the vehicle 10 is shown.

As shown in FIG. 2 and FIG. 3, the front side door 12 is provided with a door outer panel 26 and a door inner panel 28. The door outer panel 26 is disposed at the vehicle width direction outer side, and the door inner panel 28 is disposed at the vehicle width direction inner side relative to the door outer panel 26. A terminating portion 26A of a periphery edge of the door outer panel 26 is made integral with a terminating portion 28A of a periphery edge of the door inner panel 28 by hemming. Thus, the door outer panel 26 and door inner panel 28 are formed into a chamber structure. A reinforcing member 62 is disposed substantially along the vehicle vertical direction at the rear end portion side of the interior of the front side door 12 (that is, at the side of the front side door 12 at which the rear side door 14 is disposed). The reinforcing member 62 is joined to a wall portion of the front side door 12 and constitutes a door-integrated pillar. In the first exemplary embodiment, the reinforcing member 62 is disposed in a region at the vehicle width direction outer side of the interior of the front side door 12. However, this structure is not limiting; the position of the reinforcing member 62 may be modified.

The door outer panel 26 is provided with an outer side wall portion 26B that is arranged substantially along the vehicle vertical direction and the vehicle front-and-rear direction at the vehicle width direction outer side. The terminating portion 26A is formed continuously from the outer side wall portion 26B.

The door inner panel 28 is provided with an inner side wall portion 28B and an upright wall portion 28C. The inner side wall portion 28B is arranged substantially along the vehicle vertical direction and the vehicle front-and-rear direction at the vehicle width direction inner side. The upright wall portion 28C is inflected to the vehicle width direction outer side from a vehicle front-and-rear direction rear end portion of the inner side wall portion 28B. The door inner panel 28 is further provided with a first periphery edge portion 28D and a second periphery edge portion 28F. The first periphery edge portion 28D is inflected substantially toward the vehicle rear side from a vehicle width direction outer side end portion of the upright wall portion 28C. The second periphery edge portion 28F is inflected toward the vehicle width direction outer side from a vehicle front-and-rear direction rear end portion of the first periphery edge portion 28D, via a corner portion 28E. A vehicle width direction outer side end portion of the second periphery edge portion 28F is inflected toward the vehicle rear side, thus forming the terminating portion 28A.

The rear side door 14 is provided with a door outer panel 30 and a door inner panel 32. The door outer panel 30 is disposed at the vehicle width direction outer side, and the door inner panel 32 is disposed at the vehicle width direction inner side relative to the door outer panel 30. A terminating portion 32A of a periphery edge of the door inner panel 32 is made integral with a terminating portion 30A of a periphery edge of the door outer panel 30 by hemming. Thus, the door outer panel 30 and door inner panel 32 are formed into a chamber structure. A reinforcing member 64 is disposed substantially along the vehicle vertical direction at the front end portion side of the interior of the rear side door 14 (that is, at the side of the rear side door 14 at which the front side door 12 is disposed). The reinforcing member 64 is joined to a wall portion of the rear side door 14 and constitutes a door-integrated pillar. In the first exemplary embodiment, the reinforcing member 64 is disposed in a region at the vehicle width direction outer side of the interior of the rear side door 14. However, this structure is not limiting; the position of the reinforcing member 64 may be modified. The reinforcing member 64 may be disposed in a region at the vehicle width direction inner side of the interior of the rear side door 14, forming an open portion or the like such that the reinforcing member 64 does not interfere with a moving device 42, which is described below.

The door inner panel 32 is provided with an inner side wall portion 32B, which is arranged substantially along the vehicle vertical direction and the vehicle front-and-rear direction at the vehicle width direction inner side. The terminating portion 32A is formed continuously from the inner side wall portion 32B. In the first exemplary embodiment, the terminating portion 32A of the door inner panel 32 covers the terminating portion 30A of the door outer panel 30. Thus, the door outer panel 30 and the door inner panel 32 are made integral.

The door outer panel 30 is provided with an outer side wall portion 30B and a periphery edge portion 30C. The outer side wall portion 30B is arranged substantially along the vehicle vertical direction and the vehicle front-and-rear direction at the vehicle width direction outer side. The periphery edge portion 30C is inflected to the vehicle width direction inner side from a vehicle front-and-rear direction front end portion of the outer side wall portion 30B. The door outer panel 30 is provided with a concavity portion 30D, which is recessed in a concave shape toward the vehicle rear side and the vehicle width direction inner side from a vehicle width direction inner side end portion of the periphery edge portion 30C. The concavity portion 30D is provided with a side wall portion 34A, a floor wall portion 34B and a side wall portion 34C. The side wall portion 34A extends substantially toward the vehicle rear side from the vehicle width direction inner side end portion of the periphery edge portion 30C. The floor wall portion 34B extends substantially toward the vehicle width direction inner side from a vehicle front-and-rear direction rear end portion of the side wall portion 34A. The side wall portion 34C extends substantially toward the vehicle front side from a vehicle width direction inner side end portion of the floor wall portion 34B.

The door outer panel 30 is further provided with a protrusion portion 30E and an edge wall portion 30F. The protrusion portion 30E protrudes substantially toward the vehicle width direction outer side and the vehicle front side from the side wall portion 34C of the concavity portion 30D. The edge wall portion 30F is inflected substantially toward the vehicle width direction inner side from a vehicle front-and-rear direction front end portion of the protrusion portion 30E. The terminating portion 30A is formed by being inflected substantially toward the vehicle front side from a vehicle width direction inner side end portion of the edge wall portion 30F.

Figure 4:
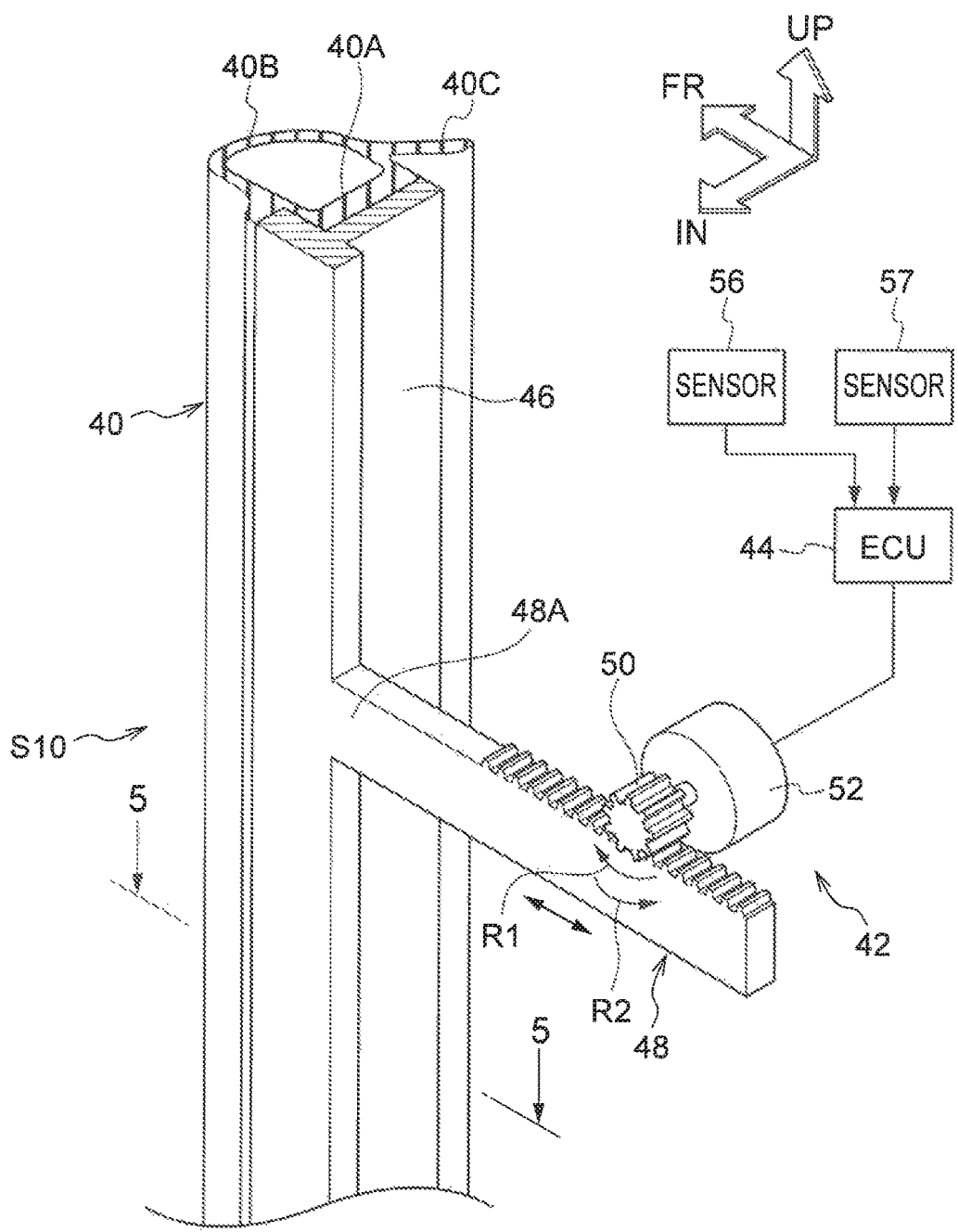
FIG. 4 is a perspective view showing the weatherstrip and a moving device that are shown in FIG. 2.
Figure 5:
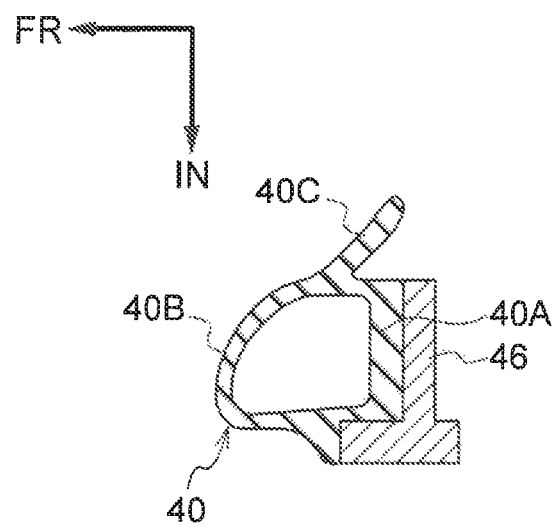
FIG. 5 is a sectional diagram showing the weatherstrip and a frame, cut along line 5-5 in FIG. 4.

As shown in FIG. 2 to FIG. 4, a weatherstrip 40 is provided at the door structure for a vehicle S10. The weatherstrip 40 is provided at the front end portion 14A of the rear side door 14, which serves as one door. The weatherstrip 40 is disposed so as to change a distance D (see FIG. 2 and FIG. 3) between the weatherstrip 40 and the front side door 12, which serves as the other door. The moving device 42 and an electronic control unit (ECU) 44 (see FIG. 4) are also provided at the door structure for a vehicle S10. The moving device 42 moves the weatherstrip 40 in both a direction to put the weatherstrip 40 into area contact with the front side door 12 and a direction away from the front side door 12. The ECU 44 serves as a control device that controls movements of the moving device 42.

The weatherstrip 40 is provided substantially along the vehicle vertical direction at the front end portion 14A, which is an outer periphery portion of the rear side door 14 (see FIG. 1). A length of the weatherstrip 40 in the vertical direction is substantially the same as a length of the front end portion 14A of the rear side door 14 in the vertical direction. The corner portion 28E of the door inner panel 28 of the front side door 12 is disposed at a position opposing the weatherstrip 40, and the corner portion 28E of the door inner panel 28 is formed in a shape protruding toward the weatherstrip 40. The weatherstrip 40 is structured to make area contact with the corner portion 28E (that is, the corner portion 28E between the first periphery edge portion 28D and the second periphery edge portion 28F) of the rear end portion 12B of the front side door 12 (see FIG. 2). The weatherstrip 40 is provided with an attachment portion 40A and a tubular portion 40B (see FIG. 5). The attachment portion 40A is attached to a frame 46, which is described below. The tubular portion 40B is structured to include a portion of the attachment portion 40A and has a hollow shape that protrudes toward the side thereof at which the front side door 12 is disposed. The tubular portion 40B constitutes a sealing portion. The weatherstrip 40 according to the first exemplary embodiment is also provided with a lip 40C that extends from the tubular portion 40B so as to make contact with the periphery edge portion 30C of the rear side door 14. The tubular portion 40B of the weatherstrip 40 comes into contact with the corner portion 28E of the rear end portion 12B of the front side door 12 and is depressed by resilient deformation. Thus, the tubular portion 40B makes area contact with the corner portion 28E of the rear end portion 12B of the front side door 12.

As shown in FIG. 2 to FIG. 4, the moving device 42 is provided with a rack 48 and the frame 46. The rack 48 serves as a moving member that moves in both the direction approaching the front side door 12 and the direction away from the front side door 12. The frame 46 is attached to an end portion 48A of the rack 48. The moving device 42 is further provided with a pinion 50 and the motor 52. The pinion 50 meshes with the rack 48, and the motor 52 rotates the pinion 50. An aperture portion 35 is provided in the floor wall portion 34B of the concavity portion 30D of the door outer panel 30. The end portion 48A of the rack 48 is inserted into the aperture portion 35 to be movable in a length direction, and the end portion 48A of the rack 48 is attached to a rear face at the opposite side of the frame 46 from the side thereof at which the weatherstrip 40 is disposed. The rack 48 is arranged substantially along the vehicle front-and-rear direction. The rack 48 is structured to move the frame 46 and the weatherstrip 40 substantially in the vehicle front-and-rear direction when the rack 48 is moved substantially in the vehicle front-and-rear direction by rotation of the pinion 50, as a result of which the distance D between the weatherstrip 40 and the front side door 12 (see FIG. 2 and FIG. 3) is altered. The first exemplary embodiment has a structure in which the weatherstrip 40 changes between a position at which the weatherstrip 40 is in area contact with the front side door 12 and the distance D is zero (that is, a position D0 as shown in FIG. 2), and a position at which the weatherstrip 40 is separated from the front side door 12 and the distance D is at a maximum (that is, a position D1 as shown in FIG. 3). Actually, given that the weatherstrip 40 is depressed by resilient deformation when put into area contact with the front side door 12, the symbol D1 represents a movement distance of a face of the attachment portion 40A of the weatherstrip 40 that is in contact with the frame 46.

A cross section of the frame 46 is formed in a substantial "T" shape. The attachment portion 40A of the weatherstrip 40 is attached to one recess corner portion side of the frame 46. In the first exemplary embodiment, the attachment portion 40A of the weatherstrip 40, which is formed to match the shape of the surface of the frame 46, is fixed by adhesion or the like to the frame 46 (see FIG. 5). The frame 46 is arranged along the vehicle vertical direction to match the length in the vertical direction of the weatherstrip 40. The frame 46 is structured to support the weatherstrip 40 over substantially the whole length thereof in the vertical direction, and is structured to move substantially in the vehicle front-and-rear direction within the concavity portion 30D of the door outer panel 30.

At the moving device 42, the frame 46 attached to the end portion 48A of the rack 48 is moved toward the front side door 12 (see the direction of arrow A in FIG. 2) and the weatherstrip 40 is put into area contact with the front side door 12 by the pinion 50 being turned forward in direction R1 (that is, rotated in the clockwise direction R1 in FIG. 4) by the motor 52. More specifically, in this structure the tubular portion 40B of the weatherstrip 40 makes area contact with the corner portion 28E (that is, the corner portion 28E between the first periphery edge portion 28D and the second periphery edge portion 28F) of the rear end portion 12B of the front side door 12 (see FIG. 2).

Furthermore, the frame 46 attached to the end portion 48A of the rack 48 is moved in the direction away from the front side door 12 (see the direction of arrow B in FIG. 3) and the weatherstrip 40 is separated from the front side door 12 by the pinion 50 being turned backward in direction R2 (that is, rotated in the counterclockwise direction R2 in FIG. 4) by the motor 52. More specifically, in this structure the tubular portion 40B of the weatherstrip 40 is separated from the corner portion 28E (that is, the corner portion 28E between the first periphery edge portion 28D and the second periphery edge portion 28F) of the rear end portion 12B of the front side door 12 (see FIG. 3).

As shown in FIG. 4, a sensor 56 that detects whether or not the front side door 12 is closed (for example, a courtesy switch) is provided at the front side door 12, and a sensor 57 that detects whether or not the rear side door 14 is closed (for example, a courtesy switch) is provided at the rear side door 14. In the first exemplary embodiment, when the sensors 56 and 57 detect that both the front side door 12 and the rear side door 14 are closed (that is, are in closed states), the ECU 44 determines (identifies) that the front side door 12 and the rear side door 14 are not opening or closing. When the ECU 44 detects from signals from the sensors 56 and 57 that the front side door 12 and the rear side door 14 have both gone into the closed states thereof, the ECU 44 drives the motor 52 and the pinion 50 is turned forward in direction R1 (that is, the pinion 50 rotates in the clockwise direction R1 in FIG. 4). As a result, as shown in FIG. 2, the frame 46 attached to the end portion 48A of the rack 48 is moved toward the front side door 12 (that is, to the front side in the vehicle front-and-rear direction indicated by arrow A), and the weatherstrip 40 is put into area contact with the corner portion 28E of the front side door 12.

When an opening operation of the door outside handle 20 of the front side door 12 (see FIG. 1) of the vehicle 10 is performed (that is, an operation to move the door outside handle 20 in the opening direction), this opening operation is detected by an unillustrated sensor (for example, a handle switch). Similarly, when an opening operation of the door outside handle 24 of the rear side door 14 (see FIG. 1) is performed, this opening operation is detected by another unillustrated sensor (for example, a handle switch). When the ECU 44 detects an opening operation of either of the door outside handle 20 and the door outside handle 24 from the state in which both the front side door 12 and the rear side door 14 are closed, the ECU 44 drives the motor 52 and the pinion 50 is turned backward in direction R2 (that is, the pinion 50 rotates in the counterclockwise direction R2 in FIG. 4). As a result, as shown in FIG. 3, the frame 46 attached to the end portion 48A of the rack 48 is moved in the direction away from the front side door 12 (that is, to the rear side in the vehicle front-and-rear direction indicated by arrow B), and the weatherstrip 40 is separated from the corner portion 28E of the front side door 12. The same applies when a door inside handle is operated.

As shown in FIG. 2 and FIG. 3, an angled portion that is angled to the vehicle rear side from a vehicle inner side portion toward a vehicle outer side portion is provided at the periphery edge portion 30C of the door outer panel 30 of the rear side door 14. A weatherstrip 58 is attached to the angled portion. In the first exemplary embodiment, the weatherstrip 58 is structured to be in contact with the terminating portion 26A of the door outer panel 26 of the front side door 12 in the state in which the front side door 12 and the rear side door 14 are closed.

Now, operation and effects of the first exemplary embodiment are described.

In the door structure for a vehicle S10, the front side door 12 and rear side door 14 that serve as the two doors disposed to be adjacent at front and rear are provided at the side portion 11A of the vehicle body 11. No center pillar is provided between the front side door 12 and the rear side door 14. The weatherstrip 40 is disposed at the front end portion 14A of the rear side door 14 so as to change the distance between the weatherstrip 40 and the front side door 12. The weatherstrip 40 is moved by the moving device 42 in both the direction of putting the weatherstrip 40 into area contact with the front side door 12 and the direction of separating the weatherstrip 40 from the front side door 12.

In the door structure for a vehicle S10, when the ECU 44 detects that both the front side door 12 and the rear side door 14 are in the closed states thereof from signals from the sensors 56 and 57 (see FIG. 4), the ECU 44 operates the moving device 42 and puts the weatherstrip 40 into area contact with the front side door 12. In the first exemplary embodiment, as shown in FIG. 2, the ECU 44 moves the rack 48 toward the front side door 12 (that is, in the direction of arrow A) and puts the weatherstrip 40 into area contact with the front side door 12 by driving the motor 52 and causing the pinion 50 to turn forward. Therefore, when both the front side door 12 and the rear side door 14 are in the closed states, the weatherstrip 40 of the rear side door 14 is in area contact with the front side door 12. Thus, water ingress between the front side door 12 and the rear side door 14 where no center pillar is present is suppressed.

In the door structure for a vehicle S10, opening operations of the door outside handle 20 of the front side door 12 and the door outside handle 24 of the rear side door 14 are detected by respective sensors (not shown in the drawings). From the state in which both the front side door 12 and the rear side door 14 are closed, when an opening operation of either of the door outside handle 20 and the door outside handle 24 is detected, the ECU 44 of the door structure for a vehicle S10 operates the moving device 42 and separates the weatherstrip 40 from the front side door 12. In the first exemplary embodiment, as shown in FIG. 3, the ECU 44 moves the rack 48 in the direction away from the front side door 12 (that is the direction of arrow B) and separates the weatherstrip 40 of the rear side door 14 from the front side door 12 by driving the motor 52 and causing the pinion 50 to turn backward. Therefore, in a state in which a single door of the front side door 12 and the rear side door 14 is closed, when the counterpart door of the front side door 12 and the rear side door 14 is opening, contact and friction between the weatherstrip 40 of the rear side door 14 and the front side door 12 is suppressed.

The door structure for a vehicle S10 according to the first exemplary embodiment is a structure in which the position of the weatherstrip 40 shown in FIG. 3 is maintained until the state in which both the front side door 12 and the rear side door 14 are closed again is detected by the sensors 56 and 57. Therefore, when the counterpart door of the front side door 12 and the rear side door 14 is opening or closing in the state in which the single door of the front side door 12 and the rear side door 14 is closed, the weatherstrip 40 may be separated from the front side door 12.

Therefore, in the door structure for a vehicle S10, both a suppression of water ingress between the front side door 12 and the rear side door 14 where no center pillar is present and a suppression of contact friction between the weatherstrip 40 provided at the rear side door 14 and the front side door 12 may be realized.

Moreover, the moving device 42 is provided with the frame 46 to which the end portion 48A of the rack 48 is attached, and the weatherstrip 40 is attached to the frame 46. Thus, the weatherstrip 40 is put into area contact with the front side door 12 and is separated from the front side door 12 by the weatherstrip 40 that is attached to the frame 46 being moved. Therefore, the moving device 42 may be structured integrally with the weatherstrip 40, in addition to which the weatherstrip 40 may be put into substantially uniform area contact with the front side door 12.

First Variant Example

In the door structure for a vehicle S10, the ECU 44 operates the moving device 42 and puts the weatherstrip 40 into area contact with the front side door 12 when the closed states of both the front side door 12 and the rear side door 14 are detected by the sensors 56 and 57. However, the present disclosure is not limited by this configuration. For example, a door structure for a vehicle according to a first variant example may be a structure in which a first sensor that detects when the front side door 12 is in a locked state and a second sensor that detects when the rear side door 14 is in a locked state are provided, and signals from the first sensor and the second sensor are utilized. For example, the ECU 44 receives signals from the first sensor and the second sensor, and when the ECU 44 detects that both the front side door 12 and the rear side door 14 are in the locked states thereof, the ECU 44 may determine that the front side door 12 and the rear side door 14 will not be opening or closing. That is, when the ECU 44 detects that both the front side door 12 and the rear side door 14 are in the locked states from signals from the first sensor and the second sensor, the ECU 44 operates the moving device 42 and puts the weatherstrip 40 of the rear side door 14 into area contact with the front side door 12. Because it is assured that the front side door 12 and the rear side door 14 will not be opening and closing when the locked states of both the front side door 12 and the rear side door 14 are detected, contact friction between the weatherstrip 40 and the front side door 12 may be more assuredly suppressed.

Second Variant Example

In the door structure for a vehicle S10 according to the first exemplary embodiment, when an opening operation of the door outside handle 20 or the door outside handle 24 (that is, an operation to move the door outside handle 20 or the door outside handle 24 in the opening direction thereof) is detected by the respective sensor (not shown in the drawings), the ECU 44 operates the moving device 42 and separates the weatherstrip 40 from the front side door 12. However, the present disclosure is not limited by this configuration. For example, a second variant example is possible in which the ECU 44 operates the moving device 42 and separates the weatherstrip 40 of the rear side door 14 from the front side door 12 when the ECU 44 detects, from signals from the first sensor and the second sensor, that one of the front side door 12 and the rear side door 14 is in an unlocked state thereof.

Second Exemplary Embodiment

Figure 6:
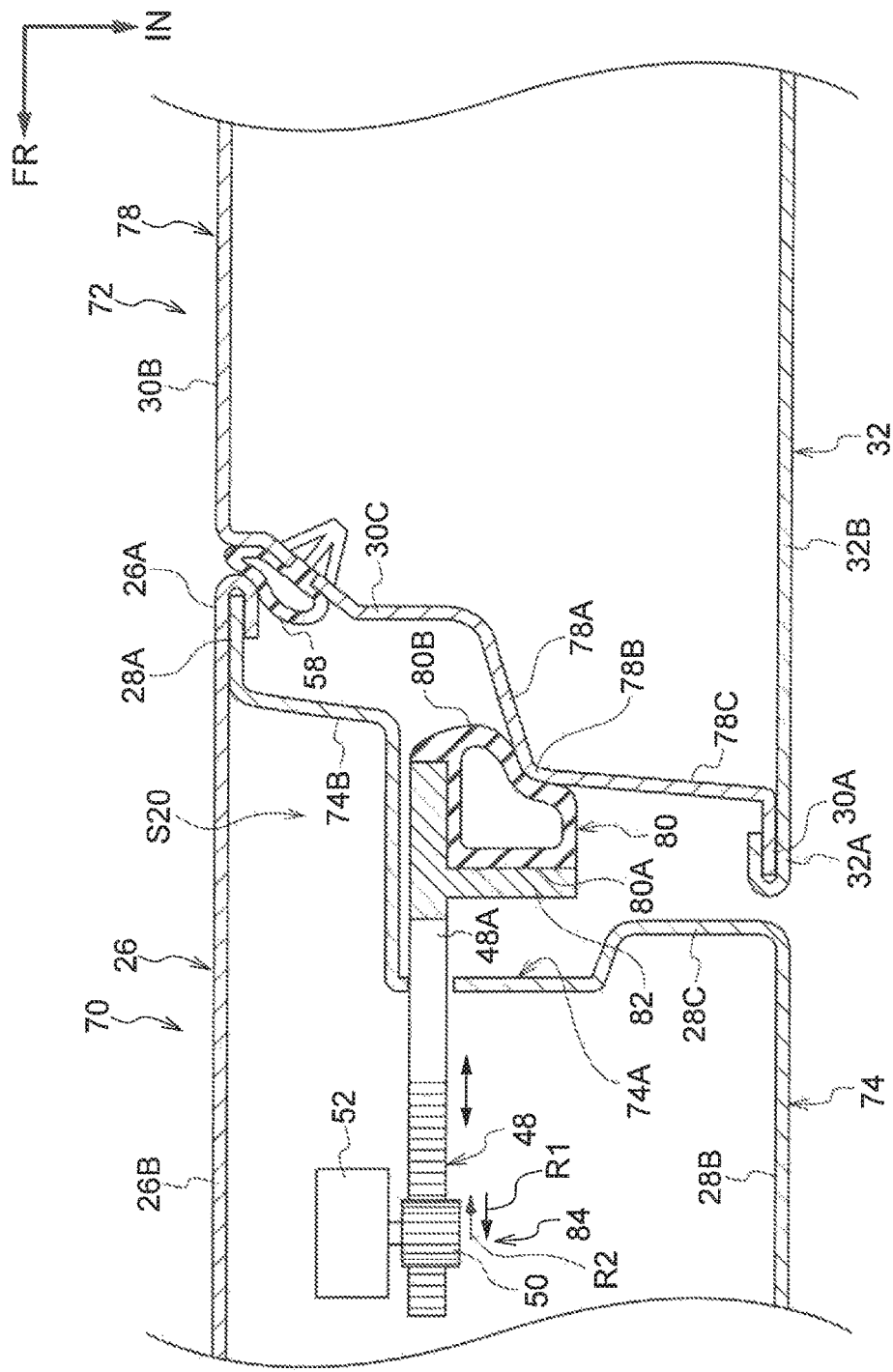
FIG. 6 is a sectional diagram showing a door structure for a vehicle in accordance with a second exemplary embodiment.

Now, a door structure for a vehicle according to a second exemplary embodiment is described using FIG. 6. Structural portions that are the same as in the first exemplary embodiment described above are assigned the same reference numerals, and descriptions thereof are not given.

FIG. 6 is a sectional diagram showing a front side door 70 and a rear side door 72 at which a door structure for a vehicle S20 according to the second exemplary embodiment is employed. As shown in FIG. 6, in the door structure for a vehicle S20 according to the second exemplary embodiment, a weatherstrip 80 is provided at the front side door 70, which serves as the one door, so as to change the distance D between the weatherstrip 80 and the rear side door 72, which serves as the other door. A moving device 84 and an ECU (not shown in the drawings) are also provided at the door structure for a vehicle S20. The moving device 84 moves the weatherstrip 80 in both the direction of putting the weatherstrip 80 into area contact with the rear side door 72 and the direction away from the rear side door 72. The ECU serves as the control device that controls movements of the moving device 84.

A door inner panel 74 of the front side door 70 is provided with a concavity portion 74A and a periphery edge portion 74B. The concavity portion 74A is recessed toward the vehicle front side and the vehicle width direction outer side from a vehicle width direction outer side end portion of the upright wall portion 28C. The periphery edge portion 74B is inflected toward the vehicle width direction outer side from a rear end portion of the concavity portion 74A. The weatherstrip 80 is disposed at the concavity portion 74A. The weatherstrip 80 is attached to a frame 82 with a substantial "L" shape in cross section. More specifically, the weatherstrip 80 is provided with an attachment portion 80A and a tubular portion 80B. The attachment portion 80A is formed in a shape that matches a recess corner portion of the frame 82. The tubular portion 80B is structured to include a portion of the attachment portion 80A and has a hollow shape that protrudes toward the vehicle rear side. The tubular portion 80B constitutes a sealing portion. The moving device 84 is provided with the rack 48, and the frame 82 is attached to the end portion 48A of the rack 48. The frame 82 is disposed to be movable substantially in the vehicle front-and-rear direction within the concavity portion 74A of the door inner panel 74. Thus, the weatherstrip 80 is structured to be moved substantially in the vehicle front-and-rear direction by movement of the rack 48 in the arrowed direction.

A door outer panel 78 of the rear side door 72 is provided with a middle wall portion 78A and an edge wall portion 78C. The middle wall portion 78A is inflected substantially toward the vehicle front side from the vehicle width direction inner side end portion of the periphery edge portion 30C. The edge wall portion 78C is inflicted toward the vehicle width direction inner side from a front end portion of the middle wall portion 78A, via a corner portion 78B. The corner portion 78B is disposed at a position opposing the weatherstrip 80 and is formed in a shape protruding toward the weatherstrip 80.

Control timings of the moving device 84 by the ECU (not shown in the drawings) are similar to the first exemplary embodiment. The control according to the first variant example may also be applied to the door structure for a vehicle S20. Reinforcing members that serve as door-integrated pillars disposed inside each of the front side door 70 and the rear side door 72 are not shown in FIG. 6.

In the door structure for a vehicle S20, when it is detected by the sensors 56 and 57 (see FIG. 4) that both the front side door 70 and the rear side door 72 are in the closed states thereof, the ECU (not shown in the drawings) drives the motor 52 and causes the pinion 50 to turn forward in direction R1 (that is, to rotate in the clockwise direction R1 as viewed from the vehicle width direction outer side). As a result, the rack 48 moves toward the rear side door 72 and puts the weatherstrip 80 into area contact with the rear side door 72. When an opening operation of the front side door 70 or the rear side door 72 is detected by a respective sensor (not shown in the drawings), the ECU (not shown in the drawings) drives the motor 52 and causes the pinion 50 to turn backward in direction R2 (that is, to rotate in the counterclockwise direction R2 as viewed from the vehicle width direction outer side). As a result, the rack 48 is moved in the direction away from the rear side door 72 and the weatherstrip 80 is separated from the rear side door 72.

Therefore, in the door structure for a vehicle S20, both a suppression of water ingress between the front side door 70 and the rear side door 72 where no center pillar is present and a suppression of contact friction between the weatherstrip 80 provided at the front side door 70 and the rear side door 72 may be realized.

Third Exemplary Embodiment

Figure 7:
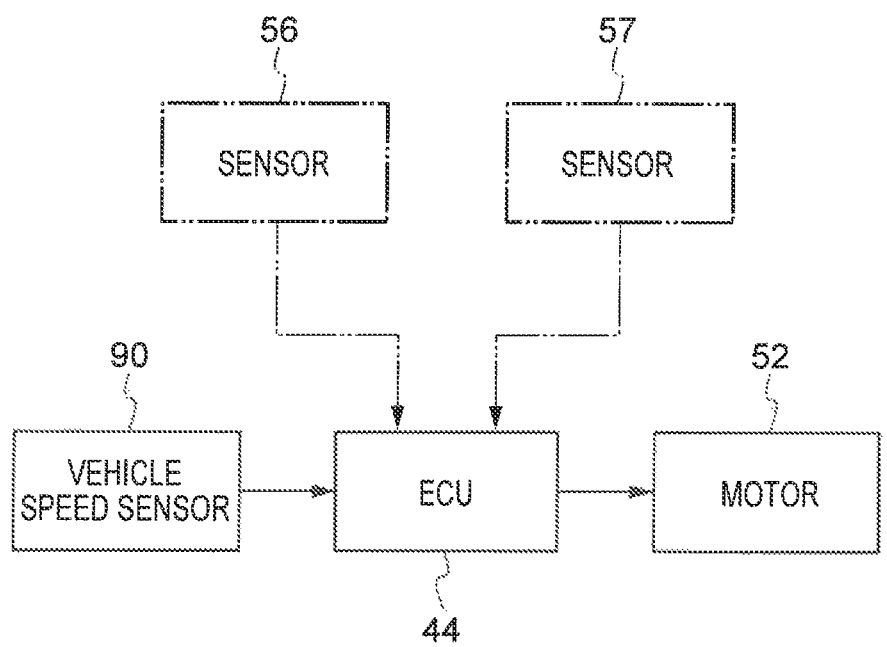
FIG. 7 is a block diagram of a control system that is used at a door structure for a vehicle in accordance with a third exemplary embodiment.

Now, a door structure for a vehicle according to a third exemplary embodiment is described using FIG. 7. Structural portions that are the same as in the first and second exemplary embodiments described above are assigned the same reference numerals, and descriptions thereof are not given.

FIG. 7 is a block diagram applying to a door structure for a vehicle according to the third exemplary embodiment. As shown in FIG. 7, in the door structure for a vehicle according to the third embodiment, a vehicle speed sensor 90 that detects vehicle speeds is provided at the vehicle 10 (see FIG. 1). The vehicle speed sensor 90 is connected to the ECU 44. The ECU 44 drives the motor 52 of the moving device 42 (see FIG. 4) in accordance with vehicle speeds detected by the vehicle speed sensor 90. Other structures of the door structure for a vehicle according to the third exemplary embodiment are the same as in the door structure for a vehicle S10 according to the first exemplary embodiment.

In the door structure for a vehicle according to the third exemplary embodiment, when a vehicle speed detected by the vehicle speed sensor 90 is at least a threshold value (for example, 5 km/h) that serves as a predetermined value, the ECU 44 drives the motor 52 of the moving device 42 and puts the weatherstrip 40 into area contact with the front side door 12 (see FIG. 2). Thus, water ingress between the front side door 12 and the rear side door 14 where no center pillar is present (see FIG. 2) is suppressed. When the vehicle speed sensor 90 detects that the vehicle speed is at least the threshold value (for example, 5 km/h), it is assured that the front side door 12 and the rear side door 14 will not be opening or closing. Therefore, contact friction between the weatherstrip 40 and the front side door 12 may be assuredly suppressed.

Third Variant Example

A third variant example of the door structure for a vehicle as depicted in FIG. 7 is possible. When it is detected from signals from the sensors 56 and 57 that both the front side door 12 and the rear side door 14 are in the closed states, the ECU 44 may drive the motor 52 of the moving device 42 and move the frame 46 to a first position at the side at which the front side door 12 is disposed, putting the weatherstrip 40 into area contact with the front side door 12 (see FIG. 2). Hence, when the vehicle speed sensor 90 detects a state in which the vehicle speed is at least the threshold value (for example, 5 km/h), the ECU 44 may drive the motor 52 of the moving device 42 and move the frame 46 to a second position that is closer to the front side door 12 than the first position, thus increasing a pressure force of the weatherstrip 40 against the front side door 12. That is, distances of movement for putting the weatherstrip 40 into contact with the front side door 12 and pressure forces may be made different between situations in which the vehicle 10 is stopped and situations in which vehicle speeds are at or above the threshold value. Similar control may also be applied to the door structure for a vehicle S20 according to the second exemplary embodiment shown in FIG. 6.

Fourth Exemplary Embodiment

Now, a door structure for a vehicle according to a fourth exemplary embodiment is described using FIG. 8. Structural portions that are the same as in the first to third exemplary embodiments described above are assigned the same reference numerals, and descriptions thereof are not given.

FIG. 8 shows a perspective view of a door structure for a vehicle S30 according to the fourth exemplary embodiment. As shown in FIG. 8, in the door structure for a vehicle S30, a plural number of the moving device 42 are arranged in the vertical direction of the weatherstrip 40. In the fourth exemplary embodiment, three of the moving devices 42 are arranged in the vertical direction of the weatherstrip 40. The weatherstrip 40 is attached to the frame 46 that is arranged substantially in the vertical direction. The rack 48 is provided at each of the three moving devices 42. The respective end portions 48A of the racks 48 are fixed to the frame 46 at three locations in the vertical direction of the frame 46. Other structures of the door structure for a vehicle S30 are the same as in the door structure for a vehicle S10 according to the first exemplary embodiment.

In the door structure for a vehicle S30, the respective end portions 48A of the racks 48 are moved towards the front side door 12 (see FIG. 2) and the weatherstrip 40 is put into area contact with the front side door 12 by an unillustrated ECU operating the three moving devices 42. Alternatively, the respective end portions 48A of the racks 48 are moved to the side away from the front side door 12 (see FIG. 2) and the weatherstrip 40 is separated from the front side door 12 by the unillustrated ECU operating the three moving devices 42.

In the door structure for a vehicle S30 described above, adherence between the weatherstrip 40 and the front side door 12 may be improved, and the weatherstrip 40 may be more assuredly separated from the front side door 12.

In the door structure for a vehicle S30, movement amounts of the end portions 48A of the racks 48 of the three moving devices 42 may be respectively altered. For example, if the sealing pressure of the weatherstrip 40 at an upper portion side in the vehicle vertical direction is to be made higher, a movement amount of the end portion 48A of the rack 48 of the moving device 42 at the upper portion side may be made larger than movement amounts of the end portions 48A of the racks 48 of the two moving devices 42 at the lower side, within a warping tolerance range of the frame 46. Thus, adherence between the weatherstrip 40 and the front side door 12 at the upper portion side in the vehicle vertical direction may be improved. Furthermore, in the door structure for a vehicle S30, the number of the moving devices 42 may be modified. In the door structure for a vehicle S20 according to the second exemplary embodiment too, a plural number of the moving device 84 may be provided in the vertical direction of the weatherstrip 80 (see FIG. 6).

Fifth Exemplary Embodiment

Figure 9A:
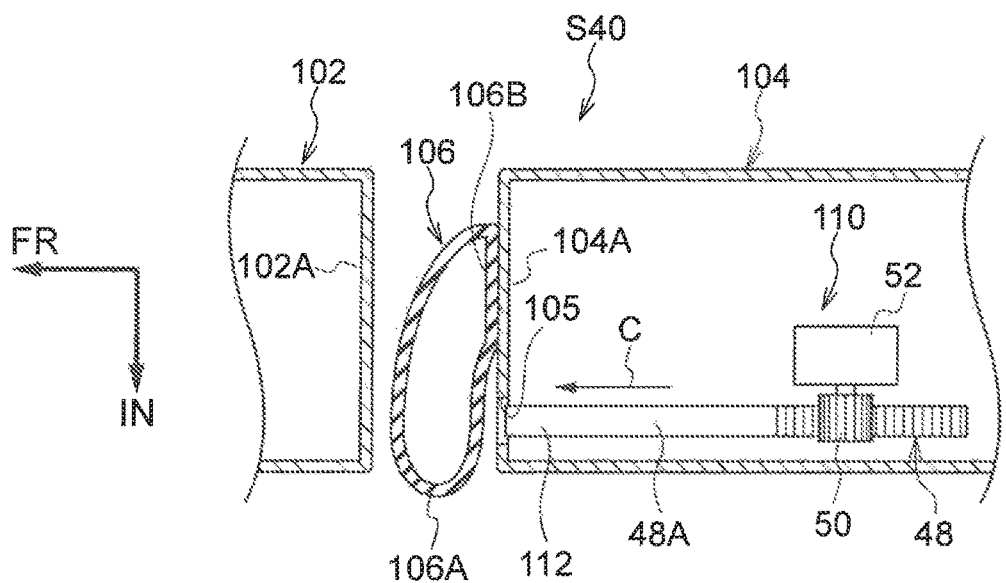
FIG. 9A is a sectional diagram showing a weatherstrip and moving device that are used in a door structure for a vehicle in accordance with a fifth exemplary embodiment, which is a diagram showing a state in which, when a front side door or a rear side door is opening, the weatherstrip is separated from the front side door.
Figure 9B:
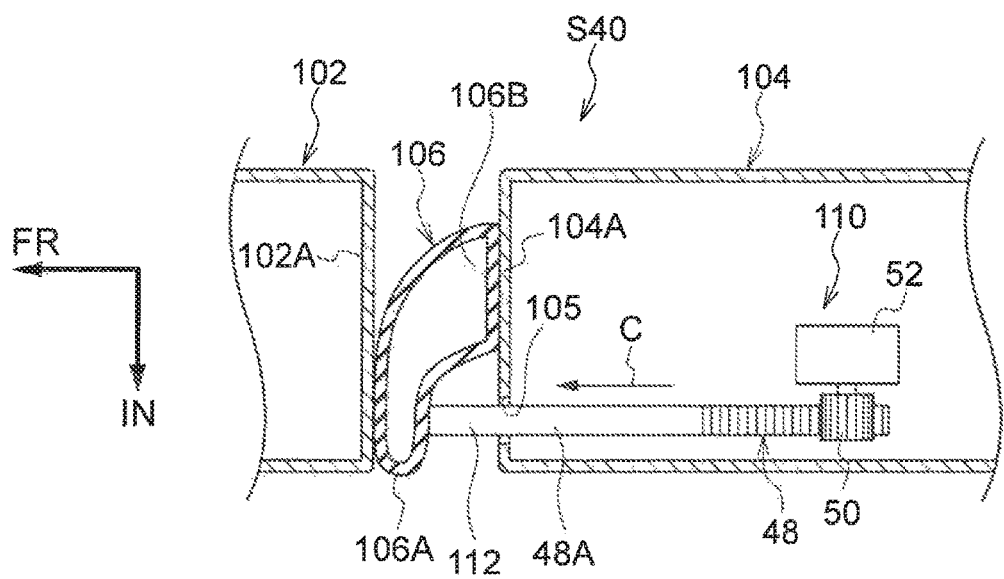
FIG. 9B is a sectional diagram showing the weatherstrip and moving device that are used in the door structure for a vehicle in accordance with the fifth exemplary embodiment, which is a diagram showing a state in which, when the front side door and rear side door have been closed, the weatherstrip is put into area contact with the front side door.

Now, a door structure for a vehicle according to a fifth exemplary embodiment is described using FIG. 9A and FIG. 9B. Structural portions that are the same as in the first to fourth exemplary embodiments described above are assigned the same reference numerals, and descriptions thereof are not given.

FIG. 9A and FIG. 9B are sectional diagrams of a door structure for a vehicle S40 according to the fifth exemplary embodiment. As shown in FIG. 9A and FIG. 9B, in the door structure for a vehicle S40 according to the fifth exemplary embodiment, a front side door 102 that serves as the other door and a rear side door 104 that serves as the one door are disposed at adjacent positions at front and rear of the side portion of the vehicle. No center pillar is provided between the front side door 102 and the rear side door 104. A rear wall portion 102A is provided at the vehicle front-and-rear direction rear end of the front side door 102. A front wall portion 104A is provided at the vehicle front-and-rear direction front end of the rear side door 104. In the state in which the front side door 102 and the rear side door 104 are closed, the rear wall portion 102A and the front wall portion 104A are disposed to oppose one another. Reinforcing members that serve as door-integrated pillars disposed inside each of the front side door 102 and the rear side door 104 are not shown in FIG. 9A and FIG. 9B.

A weatherstrip 106 is disposed at the front wall portion 104A of the rear side door 104, so as to change the distance between the weatherstrip 106 and the front side door 102 serving as the other door. The weatherstrip 106 is provided with a tubular portion 106A with a hollow shape. An attachment portion 106B that structures a portion of the tubular portion 106A is attached to the front wall portion 104A of the rear side door 104 by adhesion or the like. The tubular portion 106A constitutes a sealing portion. The tubular portion 106A is formed to protrude toward the vehicle width direction inner side from the attachment portion 106B. As shown in FIG. 9A, the weatherstrip 106 is not in contact with the rear wall portion 102A of the front side door 102 in usual conditions (that is, a natural state).

A moving device 110 is provided inside the rear side door 104. The moving device 110 moves in both a direction of putting a portion of the weatherstrip 106 into area contact with the front side door 102 and a direction away from the front side door 102. The moving device 110 is provided with a protrusion portion 112 that protrudes from the end portion 48A of the rack 48 toward the side thereof at which the front side door 102 is disposed. The protrusion portion 112 is formed continuously and integrally from the end portion 48A of the rack 48. An aperture portion 105 into which the protrusion portion 112 can be inserted is formed in the front wall portion 104A of the rear side door 104. An ECU (not shown in the drawings) that serves as the control device is connected to the motor 52 of the moving device 110.

As shown in FIG. 9B, the protrusion portion 112 provided at the end portion 48A of the rack 48 of the moving device 110 is moved toward the front side door 102 (that is, to the vehicle front side indicated by arrow C) by driving of the motor 52. Thus, the protrusion portion 112 at the end portion 48A of the rack 48 protrudes from the aperture portion 105 and pushes a portion of the weatherstrip 106 (for example, a distal end portion side of the tubular portion 106A). As a result, the weatherstrip 106 is put into area contact with the rear wall portion 102A of the front side door 102.

In the door structure for a vehicle S40, when respective sensors (not shown in the drawings) detect that both the front side door 102 and the rear side door 104 are in the closed states thereof, as shown in FIG. 9B, the protrusion portion 112 provided at the end portion 48A of the rack 48 is moved in the direction of arrow C by driving of the motor 52 and pushes the portion of the weatherstrip 106. Thus, the weatherstrip 106 is put into area contact with the rear wall portion 102A of the front side door 102.

On the other hand, when an opening operation of the front side door 102 or the rear side door 104 is detected by unillustrated sensors from the state in which both the front side door 102 and the rear side door 104 are closed, the protrusion portion 112 provided at the end portion 48A of the rack 48 is moved in the direction away from the front side door 102 by driving of the motor 52, as shown in FIG. 9A. As a result, the protrusion portion 112 is retracted through the aperture portion 105 into the rear side door 104, the pressure on the weatherstrip 106 from the protrusion portion 112 is removed, and the weatherstrip 106 separates from the front side door 102.

In the door structure for a vehicle S40 described above, the weatherstrip 106 is put into area contact with the rear wall portion 102A of the front side door 102 by the protrusion portion 112 provided at the end portion of the rack 48 of the moving device 110 pushing a portion of the weatherstrip 106. The weatherstrip 106 is separated from the front side door 102 by the pressure of the protrusion portion 112 on the weatherstrip 106 being removed. Therefore, in addition to the effects of the first exemplary embodiment, a portion of the weatherstrip 106 may be put into area contact with the front side door 102 and the weatherstrip 106 may be separated from the front side door 102 by a simple structure. Control of the moving device 110 is not limited by the first exemplary embodiment; control according to the third exemplary embodiment and the first to third variant examples may be applied.

Sixth Exemplary Embodiment

Figure 10:
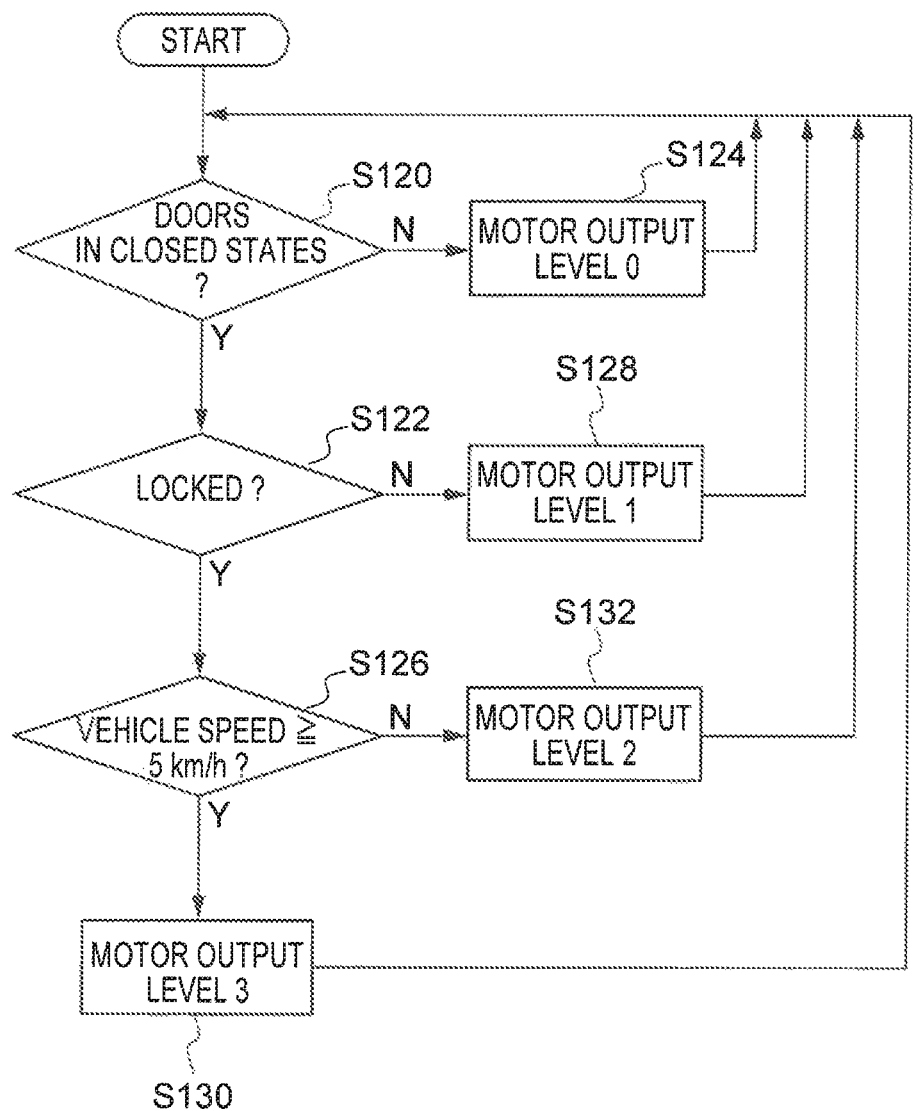
FIG. 10 is a flowchart of a control system that is used at a door structure for a vehicle in accordance with a sixth exemplary embodiment.

Now, a door structure for a vehicle according to a sixth exemplary embodiment is described using FIG. 10, FIG. 11A and FIG. 11B. Structural portions that are the same as in the first to fifth exemplary embodiments described above are assigned the same reference numerals, and descriptions thereof are not given.

As illustrated in FIG. 11A and FIG. 11B, a door structure for a vehicle S50 according to the sixth exemplary embodiment has a structure in which a protrusion amount of the protrusion portion 112 from the front wall portion 104A of the rear side door 104 is altered by an output level of the motor 52 of the moving device 110 being altered. More specifically, as shown in FIG. 11B, when the output level of the motor 52 is at a level 1, the protrusion amount of the protrusion portion 112 from the front wall portion 104A of the rear side door 104 is L1 (for example, 1 mm). In this state, the protrusion portion 112 pushes the portion of the weatherstrip 106 and puts the portion of the weatherstrip 106 into area contact with the rear wall portion 102A of the front side door 102. In FIG. 11A and FIG. 11B, note that the structure of the door structure for a vehicle S50 is illustrated out of proportion. Reinforcing members that serve as door-integrated pillars disposed inside each of the front side door 102 and the rear side door 104 are not shown in FIG. 11A and FIG. 11B.

The output level of the motor 52 is specified so as to change stepwise. As the output level is increased, the protrusion amount of the protrusion portion 112 from the front wall portion 104A of the rear side door 104 increases. As shown in FIG. 11A, when the output level of the motor 52 is at a level 3, the protrusion amount of the protrusion portion 112 from the front wall portion 104A of the rear side door 104 is L3 (for example, 5 mm), which is larger than L1. Although not shown in the drawings, when the output level of the motor 52 is at a level 2, the protrusion amount of the protrusion portion 112 from the front wall portion 104A of the rear side door 104 is L2 (for example, 3 mm), which is between L1 and L3. As the protrusion amount of the protrusion portion 112 from the front wall portion 104A of the rear side door 104 increases, a pressure force of the weatherstrip 106 against the front side door 102 increases, and thus a contact area between the weatherstrip 106 and the rear wall portion 102A increases (see FIG. 11A).

FIG. 10 shows a flowchart of control of the moving device 110 of the door structure for a vehicle S50 according to the sixth exemplary embodiment.

As shown in FIG. 10, in step 120, the ECU 44 (see FIG. 7) makes a determination as to whether both the front side door 102 and the rear side door 104 are closed. If it is detected by the sensors 56 and 57 (see FIG. 7) that both the front side door 102 and the rear side door 104 are closed, the ECU 44 determines that both the front side door 102 and the rear side door 104 are closed and then, in step 122, makes a determination as to whether both the front side door 102 and the rear side door 104 are in locked states thereof.

If the ECU 44 determines in step 120 that the front side door 102 and the rear side door 104 are not in the state in which both are closed, then the ECU 44 sets the output level of the motor 52 to zero in step 124 and does not drive the motor 52. Thus, the protrusion portion 112 is not caused to protrude from the front wall portion 104A of the rear side door 104 and the weatherstrip 106 is separated from the rear wall portion 102A of the front side door 102 (see FIG. 9A describing the fifth exemplary embodiment).

In step 122, if respective sensors (not shown in the drawings) detect that both the front side door 102 and the rear side door 104 are locked, the ECU 44 determines that both the front side door 102 and the rear side door 104 are in the locked states and then, in step 126, makes a determination as to whether the vehicle speed is at least 5 km/h. If the ECU 44 determines in step 122 that the front side door 102 and the rear side door 104 are not in the state in which both are locked, the ECU 44 sets the output level of the motor 52 to level 1 in step 128. Hence, as shown in FIG. 11B, the protrusion amount of the protrusion portion 112 from the front wall portion 104A of the rear side door 104 goes to L1 and the weatherstrip 106 makes contact with the rear wall portion 102A of the front side door 102.

In step 126, if the ECU 44 determines that a vehicle speed detected by a vehicle speed sensor (see FIG. 7) is at least 5 km/h, then the ECU 44 sets the output level of the motor 52 to level 3 in step 130. Hence, as shown in FIG. 11A, the protrusion amount of the protrusion portion 112 from the front wall portion 104A of the rear side door 104 goes to L3, which is larger than L1, and the pressure force of the weatherstrip 106 against the rear wall portion 102A of the front side door 102 is set to a maximum force.

On the other hand, if the ECU 44 determines in step 126 that the vehicle speed detected by the vehicle speed sensor (see FIG. 7) is not at least 5 km/h, then the ECU 44 sets the output level of the motor 52 to level 2 in step 132. Hence, although not shown in the drawings, the protrusion amount of the protrusion portion 112 from the front wall portion 104A of the rear side door 104 is set to L2, between L1 and L3, and the pressure force of the weatherstrip 106 against the rear wall portion 102A of the front side door 102 is set to a medium force.

Subsequently, for example, at pre-specified constant time intervals, the ECU 44 (see FIG. 7) returns to step 120 and makes the determination as to whether both of the front side door 102 and the rear side door 104 are in the closed states.

In the door structure for a vehicle S50 described above, the pressure force of the weatherstrip 106 against the rear wall portion 102A of the front side door 102 is altered stepwise by the protrusion amount of the protrusion portion 112 from the front wall portion 104A of the rear side door 104 being altered stepwise. Therefore, water ingress between the front side door 102 and the rear side door 104 where no center pillar is present may be more assuredly suppressed in accordance with conditions.

Seventh Exemplary Embodiment

Figure 12:
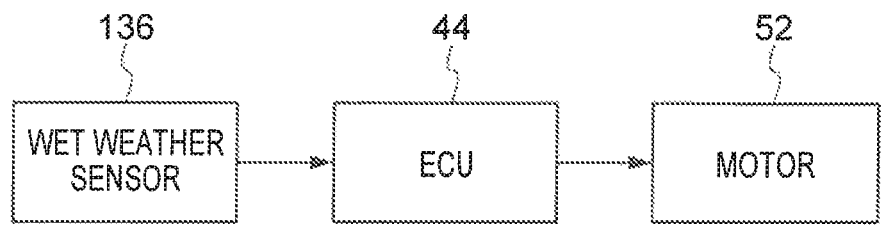
FIG. 12 is a block diagram of a control system that is used at a door structure for a vehicle in accordance with a seventh exemplary embodiment.

Now, a door structure for a vehicle according to a seventh exemplary embodiment is described using FIG. 12. Structural portions that are the same as in the first to sixth exemplary embodiments described above are assigned the same reference numerals, and descriptions thereof are not given.

FIG. 12 is a block diagram applying to the door structure for a vehicle according to the seventh exemplary embodiment. As shown in FIG. 12, a wet weather sensor 136 that detects wet weather conditions is provided at the door structure for a vehicle according to the seventh exemplary embodiment, for example, at an upper portion of the front side of the vehicle. The wet weather sensor 136 is connected with the ECU 44. The ECU 44 is configured to drive the motor 52 of a moving device (not shown in the drawings) when a wet weather condition is detected by the wet weather sensor 136. Other structures of the door structure for a vehicle according to the seventh exemplary embodiment are the same as in the door structure for a vehicle S10 according to the first exemplary embodiment. The door structure for a vehicle S20 according to the second exemplary embodiment may be employed as an alternative structure of the door structure for a vehicle according to the seventh exemplary embodiment.

In the door structure for a vehicle according to the seventh exemplary embodiment, when a wet weather condition is detected by the wet weather sensor 136, the ECU 44 drives the motor 52 of the moving device (not shown in the drawings), putting a weatherstrip provided at the one door (for example, the rear side door) into area contact with the other door (for example, the front side door). Thus, water ingress between the front side door and the rear side door where no center pillar is present may be more assuredly suppressed in wet weather conditions.

Eighth Exemplary Embodiment

Figure 13:
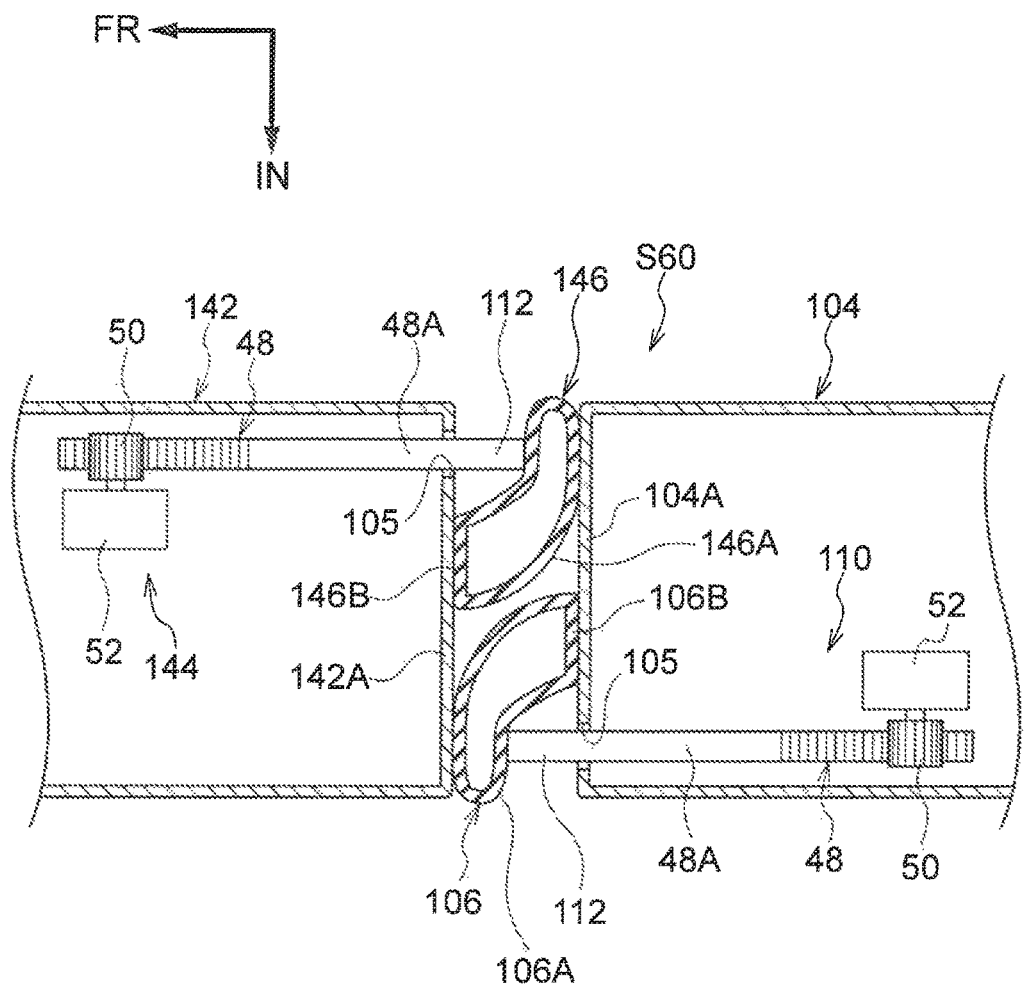
FIG. 13 is a sectional diagram showing a door structure for a vehicle in accordance with an eighth exemplary embodiment.

Now, a door structure for a vehicle according to an eighth exemplary embodiment is described using FIG. 13. Structural portions that are the same as in the first to seventh exemplary embodiments described above are assigned the same reference numerals, and descriptions thereof are not given.

FIG. 13 shows a sectional diagram of a door structure for a vehicle S60 according to the eighth exemplary embodiment. As shown in FIG. 13, at the door structure for a vehicle S60 according to the eighth exemplary embodiment, a front side door 142 and the rear side door 104 are disposed at adjacent positions at front and rear of the vehicle side portion. No center pillar is provided between the front side door 142 and the rear side door 104. A weatherstrip 146 is attached to a rear wall portion 142A of the front side door 142. The weatherstrip 146 is disposed so as to change the distance between the weatherstrip 146 and the rear side door 104. The weatherstrip 106 is attached to the front wall portion 104A of the rear side door 104. The weatherstrip 106 is disposed so as to change the distance between the weatherstrip 106 and the front side door 142. The weatherstrip 146 and the weatherstrip 106 are disposed with positions thereof offset in the vehicle width direction, and are structured so as not to overlap with one another and so as not to come into contact with one another. In the eighth exemplary embodiment, the weatherstrip 146 is disposed at the vehicle width direction outer side and the weatherstrip 106 is disposed at the vehicle width direction inner side relative to the weatherstrip 146. Reinforcing members that serve as door-integrated pillars disposed inside each of the front side door 142 and the rear side door 104 are not shown in FIG. 13.

The weatherstrip 146 is provided with a tubular portion 146A with a hollow shape. An attachment portion 146B that structures a portion of the tubular portion 146A is attached to the rear wall portion 142A of the front side door 142 by adhesion or the like. Thus, the tubular portion 146A constitutes a sealing portion. The tubular portion 146A is formed to protrude toward the vehicle width direction outer side from the attachment portion 146B. Although not shown in the drawings, the weatherstrip 146 is not in contact with the front wall portion 104A of the rear side door 104 in usual conditions (that is, a natural state).

A moving device 144 is provided inside the front side door 142. The moving device 144 moves in both a direction of putting a portion of the weatherstrip 146 into area contact with the rear side door 104 and a direction away from the rear side door 104. The moving device 144 is provided with the protrusion portion 112, continuous from the end portion 48A of the rack 48 thereof. The aperture portion 105 is formed in the rear wall portion 142A of the front side door 142. The protrusion portion 112 is inserted into the aperture portion 105 to be movable substantially in the front-and-rear direction. The weatherstrip 146 is put into area contact with the front wall portion 104A of the rear side door 104 by the protrusion portion 112 at the end portion 48A of the rack 48 protruding from the aperture portion 105 and pushing a portion of the weatherstrip 146 (for example, a distal end portion side of the tubular portion 146A). On the other hand, the pressure on the weatherstrip 146 from the protrusion portion 112 is removed and the weatherstrip 146 is separated from the front wall portion 104A of the rear side door 104 by the protrusion portion 112 at the end portion 48A of the rack 48 being moved in the direction away from the rear side door 104 (that is, toward the vehicle front side). Control of the moving devices 110 and 144 is the same as in the first exemplary embodiment. However, control according to the third exemplary embodiment, the fifth exemplary embodiment and the first to third variant examples may be applied.

In the door structure for a vehicle S60, both a suppression of water ingress between the front side door 142 and the rear side door 104 where no center pillar is present and a suppression of friction caused by contact between the weatherstrip 106 and the front side door 142 and of friction caused by contact between the weatherstrip 146 and the rear side door 104 may be realized. Furthermore, because the weather strips 146 and 106 at both the front side door 142 and the rear side door 104 are provided, water ingress between the front side door 142 and the rear side door 104 may be even more assuredly suppressed.

Supplementary Descriptions

In the first to eighth exemplary embodiments, door structures for a vehicle are recited that are provided with a front side door and a rear side door disposed at a side portion of the vehicle to be adjacent at front and rear. However, the present disclosure is not limited to door structures for a vehicle at side portions of vehicles. For example, the structure of the present disclosure may also be applied to a door structure for a vehicle that is provided with two doors disposed at a vehicle rear portion to be adjacent at left and right (where no pillar would be provided between the two doors anyway). More specifically, the present disclosure may be applied to a back door of a hatchback or the like in which double doors are disposed at the vehicle rear portion to be adjacent at left and right. When the structure of the present disclosure is applied to two doors structuring a back door, a weatherstrip provided at one door is moved substantially in the vehicle width direction when the weatherstrip is being put into area contact with the other door or the weatherstrip is being separated from the other door.

The third to seventh exemplary embodiments are applied to door structures for a vehicle in which a weatherstrip is provided at a rear side door and the weatherstrip is moved in both the direction to make area contact with a front side door and the direction away from the front side door. However, the present disclosure is not limited by this structure. For example, structures and controls according to the third to seventh exemplary embodiments may be applied to the door structure for a vehicle according to the second exemplary embodiment, which is to say a door structure for a vehicle in which a weatherstrip is provided at the front side door and the weatherstrip is put into area contact with the rear side door and is separated from the rear side door.

In the first to eighth exemplary embodiments, the weatherstrip is separated from the other door (that is, a front side door or a rear side door) when a single door of the two doors (for example, the one door) is in the closed state and the counterpart door of the two doors (for example, the other door) is opening or closing, but the present disclosure is not limited by this structure. For example, a structure is possible in which the weatherstrip is not completely separated from the other door (that is, the front side door or the rear side door) when moving in the direction away from the other door. That is, the present disclosure encompasses structures in which a degree of contact (that is, a contact force) is altered in a state in which the weatherstrip is not separated from the other door but stays in contact.

The first to eighth exemplary embodiments have structures in which the weatherstrip is operated to both the side of being put into area contact with the other door and to the opposite side (that is, in the direction away from the other door), but the present disclosure is not limited by this structure. For example, the moving device encompasses a structure that operates to move the weatherstrip only to one side and in which the weatherstrip is urged to the opposite side (that is, another side) by an urging member such as a spring or the like. In other words, the moving device encompasses structures in which the weatherstrip is reciprocated to the side of making area contact and to the opposite side by a combination of a motor and an urging member such as a spring or the like.

The first to eighth exemplary embodiments employ rack and pinion systems as the moving device that moves the weatherstrip provided at the one door in at least either one of a direction of putting the weatherstrip into area contact with the other door or a direction of separating the weatherstrip from the other door, but the present disclosure is not limited by this structure. For example, the weatherstrip may be moved by a moving device such as a hydraulic or compressed-air cylinder, an actuator or the like.

The structures and controls of two or more of the first to eighth exemplary embodiments may be combined within a technical scope not departing from the gist of the present disclosure.

The disclosures of Japanese Patent Application No. 2016-105644 filed May 26, 2016 are incorporated into the present specification by reference in their entirety.

All references, patent applications and technical specifications cited in the present specification are incorporated by reference into the present specification to the same extent as if the individual references, patent applications and technical specifications were specifically and individually recited as being incorporated by reference.

EXPLANATION OF THE REFERENCE SYMBOLS 10 vehicle
11A Side portion
12 Front side door (other door)
14 Rear side door (one door)
40 Weatherstrip
42 Moving device
44 ECU (control device)
46 Frame
48 Rack (moving member)
48A End portion
70 Front side door (one door)
72 Rear side door (other door)
80 Weatherstrip
82 Frame
84 Moving device
90 Vehicle speed sensor
102 Front side door (other door)
104 Rear side door (one door)
106 Weatherstrip
110 Moving device
112 Protrusion portion
136 Wet weather sensor
142 Front side door (one door and other door)
144 Moving device
146 Weatherstrip
S10 Door structure for a vehicle
S20 Door structure for a vehicle
S30 Door structure for a vehicle
S40 Door structure for a vehicle
S50 Door structure for a vehicle
S60 Door structure for a vehicle
D Distance

What is claimed is:

1. A door structure for a vehicle, comprising:
two doors that are disposed at at least one of: i) a vehicle side portion to be adjacent to each other along a vehicle front direction and a vehicle rear direction with no pillar therebetween, or ii) a vehicle rear portion to be adjacent to each other along a vehicle left direction and a vehicle right direction with no pillar therebetween;
a weatherstrip provided at an outer periphery portion of at least one door of the two doors, the weatherstrip being disposed so as to change a distance between the one door and the other door of the two doors;
a moving device configured to move at least a portion of the weatherstrip in at least either one of: i) a direction of putting the weatherstrip into area contact with the other door or ii) a direction of separating the weatherstrip from the other door; and
a control device configured such that:

when the control device determines that the two doors are closed and neither of the two doors is opening or closing, controls a movement of the moving device so as to put the weatherstrip into area contact with the other door, and when the control device determines that at least one of the two doors is in the closed state thereof and a counterpart door of the two doors is opening or closing, controls a movement of the moving device in the direction of separating the weatherstrip from the other door.

2. The door structure for a vehicle according to claim 1, wherein:

the moving device includes a moving member configured to move in at least either one of: (i) a direction approaching the other door or (ii) a direction away from the other door, and a frame attached to an end portion of the moving member, and the weatherstrip is attached to the frame.

3. The door structure for a vehicle according to claim 1, wherein:

the moving member includes a moving member configured to move in at least either one of: (i) a direction approaching the other door or (ii) a direction away from the other door, and a protrusion portion that is provided at an end portion of the moving member and protrudes to the side thereof at which the other door is disposed, and a portion of the weatherstrip is pushed by the protrusion portion and moves to the side at which the other door is disposed.

4. The door structure for a vehicle according to claim 3, wherein a protrusion amount of the protrusion portion to the side at which the other door is disposed is altered stepwise by the moving member, whereby a pressure force of the weatherstrip against the other door is altered.

5. The door structure for a vehicle according to claim 4, wherein a vehicle speed sensor that detects vehicle speeds is provided at the vehicle, and the control device alters a pressure force of the weatherstrip against the other door in accordance with a vehicle speed detected by the vehicle speed sensor.

6. The door structure for a vehicle according to claim 1, wherein a wet weather sensor that detects wet weather conditions is provided at the vehicle, and when a wet weather condition is detected by the wet weather sensor, the control device controls movement of the moving device in the direction of putting the weatherstrip into area contact with the other door.

7. The door structure for a vehicle according to claim 1, wherein the moving device is provided at either one of the two doors.

8. A door structure for a vehicle, comprising:

two doors that are disposed at at least one of: (i) a vehicle side portion to be adjacent to each other along a vehicle front direction and a vehicle rear direction with no pillar therebetween, or (ii) a vehicle rear portion to be adjacent to each other along a vehicle left direction and a vehicle right direction with no pillar therebetween;

a weatherstrip provided at an outer periphery portion of at least one door of the two doors, the weatherstrip being disposed so as to change a distance between the one door and the other door of the two doors;

a moving device configured to move at least a portion of the weatherstrip in at least either one of: i) a direction of putting the weatherstrip into area contact with the other door or ii) a direction of separating the weatherstrip from the other door; and a control device configured such that:

when the control device determines that the two doors are closed and neither of the two doors is opening or closing, controls a movement of the moving device so as to put the weatherstrip into area contact with the other door, and when the control device determines that at least one of the two doors is in the closed state thereof and a counterpart door of the two doors is opening or closing, controls a movement of the moving device in the direction of separating the weatherstrip from the other door, wherein, when the control device detects either (i) a state in which the two doors are locked, or (ii) a state in which a vehicle speed is at least a predetermined value, the control device causes the moving device to move so as to put the weatherstrip into area contact with the other door.

9. A door structure for a vehicle, comprising:

two doors that are disposed at at least one of: i) a vehicle side portion to be adjacent to each other along a vehicle front direction and a vehicle rear direction with no pillar therebetween, or ii) a vehicle rear portion to be adjacent to each other along a vehicle left direction and a vehicle right direction with no pillar therebetween;

a weatherstrip provided at an outer periphery portion of at least one door of the two doors, the weatherstrip being disposed so as to change a distance between the one door and the other door of the two doors;

a moving device configured to move at least a portion of the weatherstrip in at least either one of: i) a direction of putting the weatherstrip into area contact with the other door or ii) a direction of separating the weatherstrip from the other door; and a control device configured such that:

when the control device determines that the two doors are closed and neither of the two doors is opening or closing, controls a movement of the moving device so as to put the weatherstrip into area contact with the other door, when the control device determines that at least one of the two doors is in the closed state thereof and a counterpart door of the two doors is opening or closing, controls a movement of the moving device in the direction of separating the weatherstrip from the other door, wherein a plurality of moving devices are arranged in a vertical direction of the weatherstrip.

* * * * *